US012632780B2

(12) United States Patent
Dohi et al.

(10) Patent No.: US 12,632,780 B2
(45) Date of Patent: May 19, 2026

(54) ABNORMALITY DEGREE CALCULATION SYSTEM AND ABNORMALITY DEGREE CALCULATION METHOD

(71) Applicant: Hitachi, Ltd., Tokyo (JP)

(72) Inventors: Kota Dohi, Tokyo (JP); Takashi Endo, Tokyo (JP); Yohei Kawaguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1084 days.

(21) Appl. No.: 17/590,464

(22) Filed: Feb. 1, 2022

(65) Prior Publication Data

US 2022/0269988 A1 Aug. 25, 2022

(30) Foreign Application Priority Data

Feb. 22, 2021 (JP) ................................. 2021-026689

(51) Int. Cl.
*G06N 20/00* (2019.01)
*G01M 99/00* (2011.01)
(Continued)

(52) U.S. Cl.
CPC .......... *G06N 20/00* (2019.01); *G01M 99/008* (2013.01); *G05B 23/02* (2013.01); *G07C 5/0808* (2013.01)

(58) Field of Classification Search
CPC ..... G06N 20/00; G01M 99/008; G05B 23/02; G07C 5/0808; G10L 25/30; G10L 25/51; G06F 18/21
See application file for complete search history.

(56) References Cited

U.S. PATENT DOCUMENTS 8,682,824 B2     3/2014 Shibuya et al.
8,972,264 B2 *   3/2015 Chien ................... G10L 15/142
                                                        704/251
(Continued)

FOREIGN PATENT DOCUMENTS

CN        112101513 A    12/2020
JP        2014-059910 A    4/2014
JP        2019-008354 A    1/2019

OTHER PUBLICATIONS

Daniluk et al., Ensemble of Auto-Encoder Based and Wavenet Like Systems for Unsupervised Anomaly Detection, Jul. 1, 2020, Detection and Classification of Acoustic Scenes and Events 2020. (Year: 2020).*

(Continued)

*Primary Examiner* — Kenneth M Lo
(74) *Attorney, Agent, or Firm* — Volpe Koenig

(57) ABSTRACT

An abnormality degree calculation system includes a concept classification assignment unit that assigns a predetermined concept classification based on an identification number of a target device, a feature value vector extraction unit that extracts a feature value vector based on sensor data of a sensor corresponding to the target device, a likelihood calculation unit that calculates a likelihood of the feature value vector by using a machine learning model obtained from a learning database, a loss calculation unit that calculates a loss using a loss function as a function of the likelihood, a model update unit that updates the model by using the loss and a model, a re-learning necessity determination unit that determines whether re-learning is necessary from the calculated likelihood when an abnormality of the target device is detected, and an abnormality degree calculation unit that calculates an abnormality degree when the re-learning is unnecessary.

16 Claims, 18 Drawing Sheets

(51) Int. Cl.
  *G05B 23/02* (2006.01)
  *G07C 5/08* (2006.01)

(56) References Cited

U.S. PATENT DOCUMENTS

| 2020/0117948 A1* | 4/2020 | Kong | ................... G06F 18/217 |
| 2020/0394563 A1 | 12/2020 | Kokubo et al. | |
| 2021/0011791 A1* | 1/2021 | Okanohara | ......... G06F 11/0703 |

OTHER PUBLICATIONS

Giri et al., Unsupervised Anomalous Sound Detection Using Self-Supervised Classification and Group Masked Autoencoder for Density Estimation, Jul. 1, 2020, Detection and Classification of Acoustic Scenes and Events 2020. (Year: 2020).*
Extended European Search Report issued on Jul. 27, 2022 for European Patent Application No. 22152926.6.
Chinese Office Action issued on Apr. 8, 2025 for Chinese Patent Application No. 202111623368.X.

* cited by examiner

NLL(x)

NEGATIVE LOG-LIKELIHOOD OF DATA OF DIFFERENT DEVICE HAVING SAME-LEVEL CONCEPT AS DETECTION TARGET

THRESHOLD VALUE c

NEGATIVE LOG-LIKELIHOOD OF DATA OF DEVICE AS DETECTION TARGET

NUMBER OF TIMES MODEL IS UPDATED

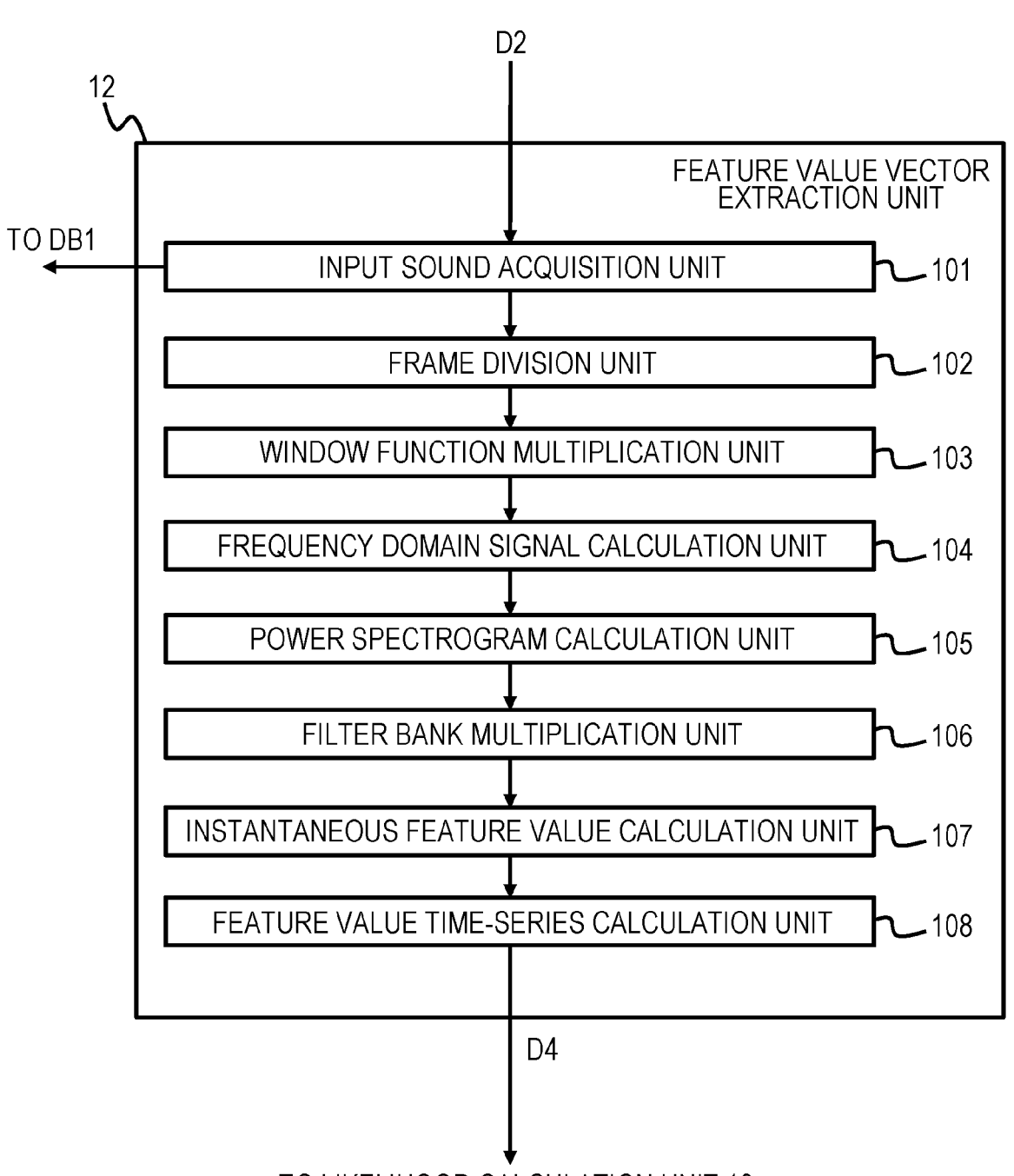

D2

12

FEATURE VALUE VECTOR
EXTRACTION UNIT

TO DB1

| INPUT SOUND ACQUISITION UNIT | 101 |

| FRAME DIVISION UNIT | 102 |

| WINDOW FUNCTION MULTIPLICATION UNIT | 103 |

| FREQUENCY DOMAIN SIGNAL CALCULATION UNIT | 104 |

| POWER SPECTROGRAM CALCULATION UNIT | 105 |

| FILTER BANK MULTIPLICATION UNIT | 106 |

| INSTANTANEOUS FEATURE VALUE CALCULATION UNIT | 107 |

| FEATURE VALUE TIME-SERIES CALCULATION UNIT | 108 |

D4

TO LIKELIHOOD CALCULATION UNIT 13

FIG. 11

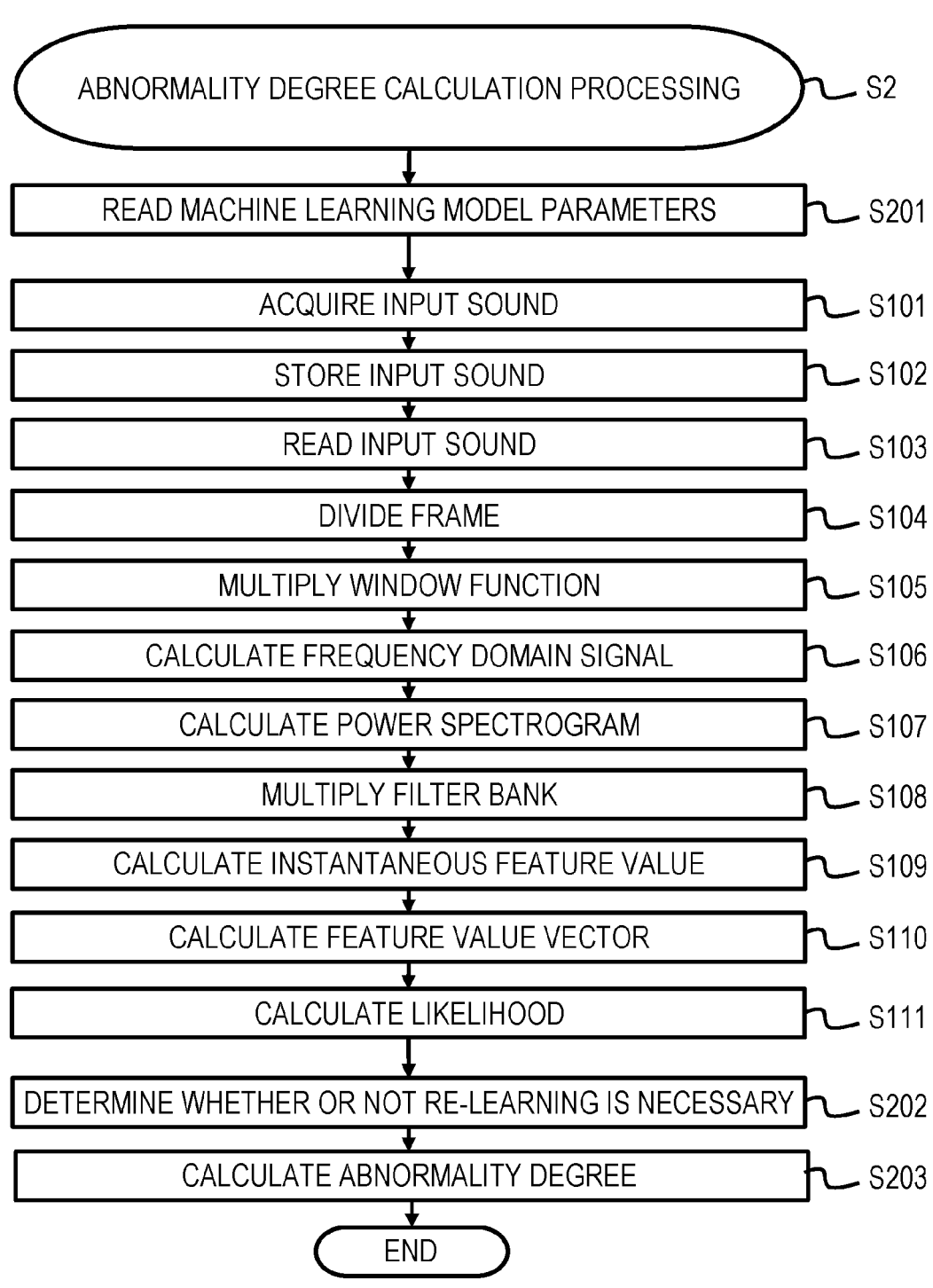

ABNORMALITY DEGREE CALCULATION PROCESSING — S2

READ MACHINE LEARNING MODEL PARAMETERS — S201

ACQUIRE INPUT SOUND — S101

STORE INPUT SOUND — S102

READ INPUT SOUND — S103

DIVIDE FRAME — S104

MULTIPLY WINDOW FUNCTION — S105

CALCULATE FREQUENCY DOMAIN SIGNAL — S106

CALCULATE POWER SPECTROGRAM — S107

MULTIPLY FILTER BANK — S108

CALCULATE INSTANTANEOUS FEATURE VALUE — S109

CALCULATE FEATURE VALUE VECTOR — S110

CALCULATE LIKELIHOOD — S111

DETERMINE WHETHER OR NOT RE-LEARNING IS NECESSARY — S202

CALCULATE ABNORMALITY DEGREE — S203

END

ABNORMALITY DEGREE CALCULATION PROCESSING — S2

READ MACHINE LEARNING MODEL PARAMETERS — S201

S101

S102

S103

S104

S105

S106

S107

S108

S109

CALCULATE FEATURE VALUE VECTOR — S110

CALCULATE LIKELIHOOD — S111

CALCULATE LOSS — S112

UPDATE PARAMETERS OF MACHINE LEARNING MODEL — S114

STORE PARAMETERS OF MACHINE LEARNING MODEL — S117

CALCULATE ABNORMALITY DEGREE — S203

END

ABNORMALITY DEGREE CALCULATION PROCESSING — S2

READ MACHINE LEARNING MODEL PARAMETERS — S201

S101

S102

S103

S104

S105

S106

S107

S108

S109

CALCULATE FEATURE VALUE VECTOR — S110

CALCULATE LIKELIHOOD — S111

CALCULATE LOSS — S112

DETERMINE WHETHER OR NOT RE-LEARNING IS NECESSARY — S202

CALCULATE ABNORMALITY DEGREE — S203

END

ABNORMALITY DEGREE CALCULATION SYSTEM AND ABNORMALITY DEGREE CALCULATION METHOD

BACKGROUND OF THE INVENTION

1. Field of the Invention

The present invention relates to an abnormality degree calculation system and method.

2. Description of the Related Art

In general, in abnormality detection, since it is difficult to acquire a sufficient amount of abnormality data for all kinds of abnormalities, a method for estimating a normal distribution by using only normal data and performing abnormality determination by using the normal distribution is often adopted.

On the other hand, even in the method for estimating the normal distribution by using only the normal data, since there are a case where the normal data cannot be sufficiently collected and a case where the normal distribution changes while a sufficient amount of normal data is being collected, a method capable of obtaining sufficient detection accuracy with a small amount of normal data is required.

Thus, a technology for improving the estimation accuracy of a normal distribution by using normal data of a device similar to a detection target and achieving sufficient detection accuracy even when the amount of normal data of the detection target is small has been proposed (JP 2019-008354 A).

JP 2019-008354 A describes that "a processing unit 11 calculates a first value which is a value indicating a degree to which a state value of a target device of interest to be derived deviates from a first distribution region indicating a distribution of state values of devices having the same kind as the target device of interest. The processing unit 11 calculates a second value, which is a value indicating a degree to which the state value of the target device of interest to be derived deviates from a second distribution region indicating a distribution of past state values of the target device of interest. The processing unit 11 determines whether or not the target device of interest is abnormal based on the first value and the second value".

SUMMARY OF THE INVENTION

The invention described in JP 2019-008354 A assumes that sensor data of a device is an abnormality detection target, and sensor data of the device having the same kind as the detection target device follows the same normal distribution. Accordingly, the technology of JP 2019-008354 A is used only when the device as the detection target and the device having the same kind as the detection target have the same concept, for example, the same model, and have the same concept lower than the above concept, for example, the same type, that is, when the devices are regarded as having both the same model and the same type.

Thus, in JP 2019-008354 A, it is not assumed that the detection target device and the device having the same kind as the detection target device have the same higher-level concept, for example, the same model, and have different lower-level concepts, for example, different types, and the normal distributions of the devices are different.

When the normal distribution of the sensor data of the detection target device and the normal distribution of the sensor data of the device having the same kind are different, in the technology of JP 2019-008354 A, since learning is performed by regarding a region that is not the normal distribution of the detection target device as the normal distribution, detection accuracy is lower than when only the sensor data of the detection target device is used.

Therefore, an object of the present disclosure is to provide an abnormality degree calculation system and method capable of calculating an abnormality degree of a device with higher accuracy.

In order to solve the above problem, an abnormality degree calculation system according to an aspect of the present invention calculates an abnormality degree of a target device, also referred to herein as a 'detection target device'. The system includes a concept classification assignment unit that assigns a predetermined concept classification based on an identification number, also referred to as a type/model number, of the target device, a feature value vector extraction unit that extracts a feature value vector based on sensor data obtained from a sensor corresponding to the target device, a likelihood calculation unit that calculates a likelihood of the feature value vector by using a machine learning model obtained from a learning database, a loss calculation unit that calculates a loss by using a loss function defined as a function of the likelihood calculated by the likelihood calculation unit, a model update unit that updates the machine learning model by using the loss calculated by the loss calculation unit and a learned machine learning model, a re-learning necessity determination unit that determines whether re-learning is necessary from the likelihood calculated by the likelihood calculation unit when an abnormality of the target device is detected, and an abnormality degree calculation unit that calculates an abnormality degree when it is determined that the re-learning is unnecessary by the re-learning necessity determination unit.

According to the present invention, since it is determined that the re-learning is necessary from the calculated likelihood when the abnormality of the target device is detected, and the abnormality degree is calculated when it is determined that the re-learning is unnecessary, the calculation accuracy of the abnormality degree is improved.

BRIEF DESCRIPTION OF THE DRAWINGS

FIG. 6 is a hardware and software configuration diagram of an abnormality degree calculation device.

FIG. 7 is a block configuration diagram of a feature value vector extraction unit.

FIG. 11 is a processing flow of the abnormality degree calculation system at the time of calculation of the abnormality degree.

DESCRIPTION OF THE PREFERRED EMBODIMENTS

Figure 1:
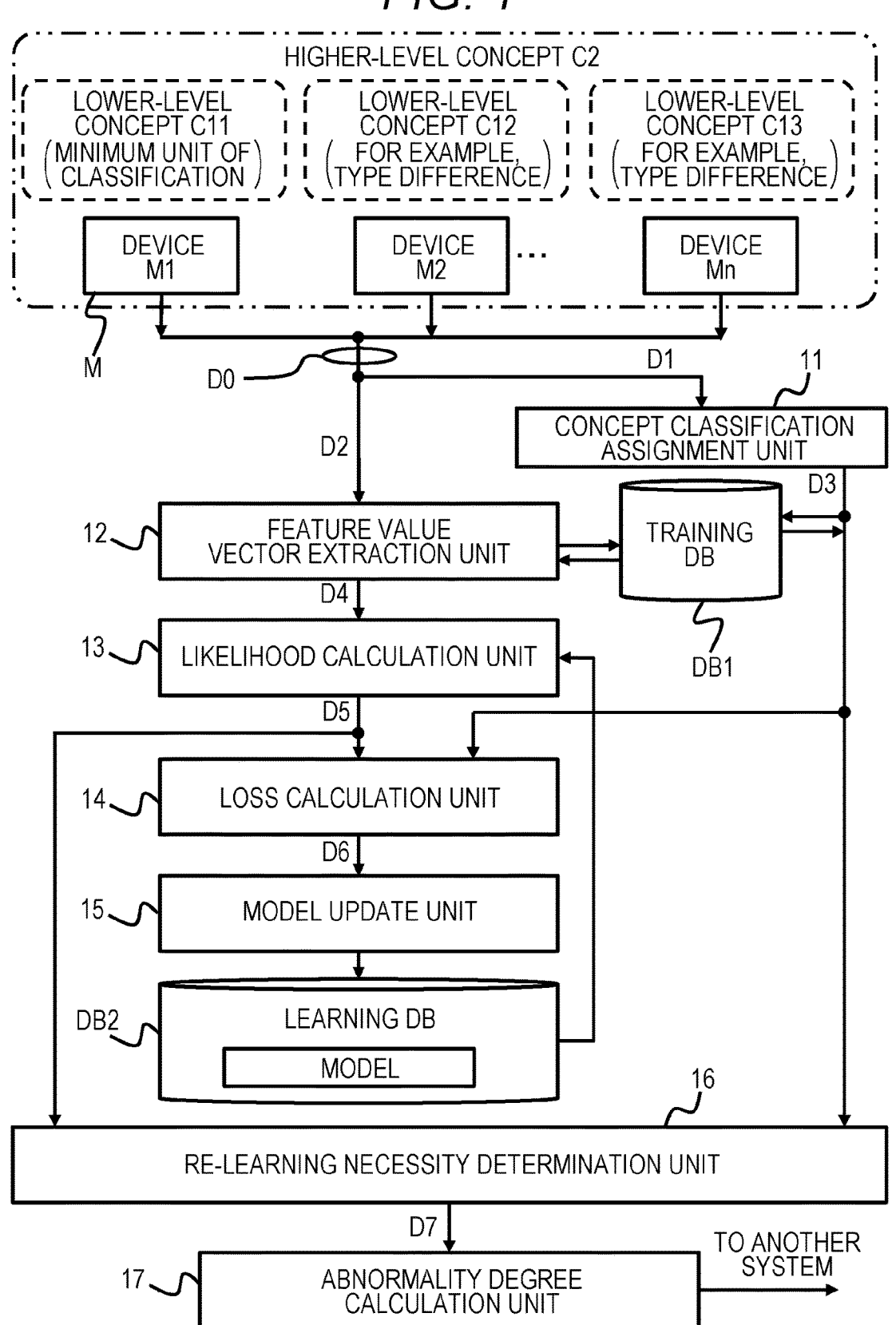
FIG. 1 is an explanatory diagram illustrating an overall outline of an embodiment.

Hereinafter, embodiments of the present invention will be described with reference to the drawings. In an abnormality degree calculation system according to the present embodiment, under an environment in which a detection target device, also referred to as a 'target device', and a device with the same higher-level concept as and a different lower-level concept from the detection target device (hereinafter, referred to as the same-level concept device or a different device) are present together, even when sensor data of the detection target device and sensor data of the same-level concept device follow different normal distributions, accuracy in detecting an abnormality can be improved by using both the pieces of sensor data. As a result, in the abnormality degree calculation system according to the present embodiment, sufficient detection accuracy can be achieved by using a relatively small amount of normal data from the detection target device.

The abnormality degree calculation system according to the present embodiment acquires inputs D0 from higher-level concept devices, for example, the same model of devices M that are n devices M including the target device. The input D0 includes a type number D1, which is an example of the lower-level concept of the model, and sensor data D2.

The abnormality degree calculation system according to the present embodiment includes a concept classification assignment unit 11 that outputs a concept classification D3 indicating whether or not each device is a device as a detection target (target device) or a device having the same-level concept as the detection target device (another device) based on the type number D1.

Furthermore, the abnormality degree calculation system according to the present embodiment includes a feature value vector extraction unit 12 that outputs a feature value D4 from the sensor data D2, a likelihood calculation unit 13 that outputs a likelihood D5 from the feature value D4 by using a machine learning model, a loss calculation unit 14 that calculates a value D6 of a loss by using a loss function defined by a function of the likelihood D5 which increases a likelihood of data from the device having the same-level concept, a model update unit 15 that updates parameters of the machine learning model of the likelihood calculation unit 13 such that the value D6 of the loss is minimized, a re-learning necessity determination unit 16 that determines whether or not re-learning is necessary from the likelihood D5 and the concept classification D3, and an abnormality degree calculation unit 17 that obtains an abnormality degree from a likelihood D7 of the detection target when it is determined that the re-learning is unnecessary.

In the present embodiment, a model in which a high likelihood is given to only the data of the detection target device and the data is regarded as being normal by performing learning such that normal data of the detection target device is regarded as normal data by increasing the likelihood of the normal data of the detection target device and normal data of a device having a normal distribution similar to that of the detection target device and having the same-level concept is regarded as abnormal data by decreasing a likelihood of the device can be obtained. Thus, the normal distribution of the data from the detection target device can be estimated accurately, as compared with the related art, in which learning is performed by using only the data of the detection target device, in the present case, sufficient detection accuracy can be obtained even when the data of the detection target device is small.

First Embodiment

A first embodiment will be described with reference to FIGS. 1 to 12. FIG. 1 is an explanatory diagram illustrating an overview of the present embodiment.

The abnormality degree calculation system 1 (see FIG. 6) calculates abnormality degrees of a plurality of devices M, illustrating physical changes measurable upon activation. The physical changes measurable according to activation include sound associated with the activation of the device, a vibration (may referred to as a signal associated with the vibration in combination with the sound and the vibration), a temperature, and color such as an electric motor, a hydraulic motor, a pneumatic cylinder, a hydraulic cylinder, a solenoid, and a linear actuator. Here, as an example, although abnormality detection by sound will be described, abnormalities can also be detected from physical changes other than sound.

The abnormality degree calculation system illustrated in FIG. 1 calculates the abnormality degree of a device selected from a plurality of devices M1 to Mn belonging to a common higher-level concept C2. The devices M1 to Mn have different lower-level concepts C1 that belong to the higher-level concept C2. For example, the higher-level concept C2 is a model, and the lower-level concepts C1 are different types belonging to that same model. In order to show that the lower-level concepts C1 are different for the devices, lower-level concepts C11 to C13 are illustrated in FIG. 1. When the type is common, a difference in serial number does not matter.

The higher-level concept C2 and the lower-level concepts C1 can also be expressed as follows. For example, the smallest unit for classifying the devices M is the lower-level concept C1, and the concept directly above it is the higher-level concept C2. Here, the device serving as the detection target is referred to as the device M1, and the other devices M2 to Mn are referred to as the same-level concept devices. When the devices M1 to Mn are not distinguished, they are called the device M or the device.

The input D0 includes the sensor data D2 acquired from the n devices M having the same model, which is an example of the higher-level concept, and the type number D1, which is an example of the lower-level concept. Hereinafter, the type number D1 may be abbreviated as the type D1.

The concept classification assignment unit 11 converts the type number D1 into the concept classification D3. The feature value vector extraction unit 12 outputs a feature value vector D4 from the sensor data D2. Hereinafter, the feature value vector D4 may be abbreviated as the feature value D4. A training database DB1 stores the sensor data D2 and the concept classification D3. The training database DB1 may be referred to as a training digital input signal database DB1.

The likelihood calculation unit 13 outputs the likelihood D5 of the sensor data for each device M from the feature value D4 by using the machine learning model given from the learning database DB2.

The loss calculation unit 14 calculates a loss function in which the likelihood of the device M1, for which the concept classification is the detection target, is high, and the likelihoods of the devices M2 to Mn having the same-level concept are low by using the concept classification D3 and the likelihood D5, and outputs a loss D6.

The model update unit 15 updates parameters of the machine learning model stored in the learning database DB2 by using the loss D6. Hereinafter, the machine learning model may be referred to as the model.

The re-learning necessity determination unit 16 determines whether re-learning is necessary by using the likelihood D5 and the concept classification D3 at the time of abnormality detection.

When it is determined that re-learning is unnecessary, the abnormality degree calculation unit 17 calculates the abnormality degree of the detection target by using the likelihood D7 of the detection target among the likelihoods D5.

Figure 2:
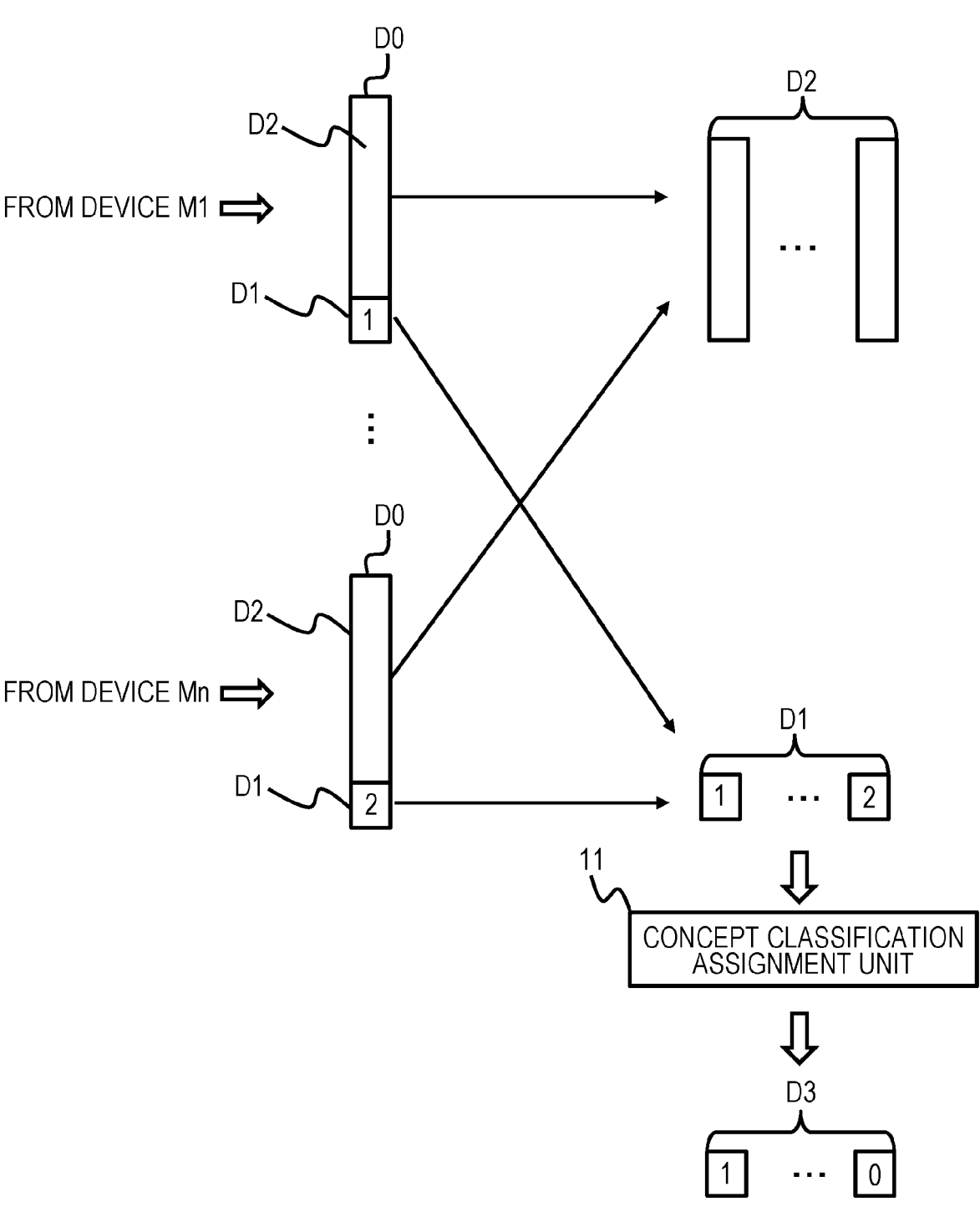
FIG. 2 is an explanatory diagram of processing of extracting concept classification from an input.

A relationship between the input D0, the type number D1, the sensor data D2, and the concept classification D3 will be described with reference to FIG. 2. The input D0 obtained from each device M includes the type number D1 and the sensor data D2. The type number D1 is converted into the concept classification D3 by the concept classification assignment unit 11. As the concept classification D3, for example, "1" is set for the detection target device M1, and "0" is set for the detection target and the other devices M2 to Mn having the same-level concept.

Figure 3:
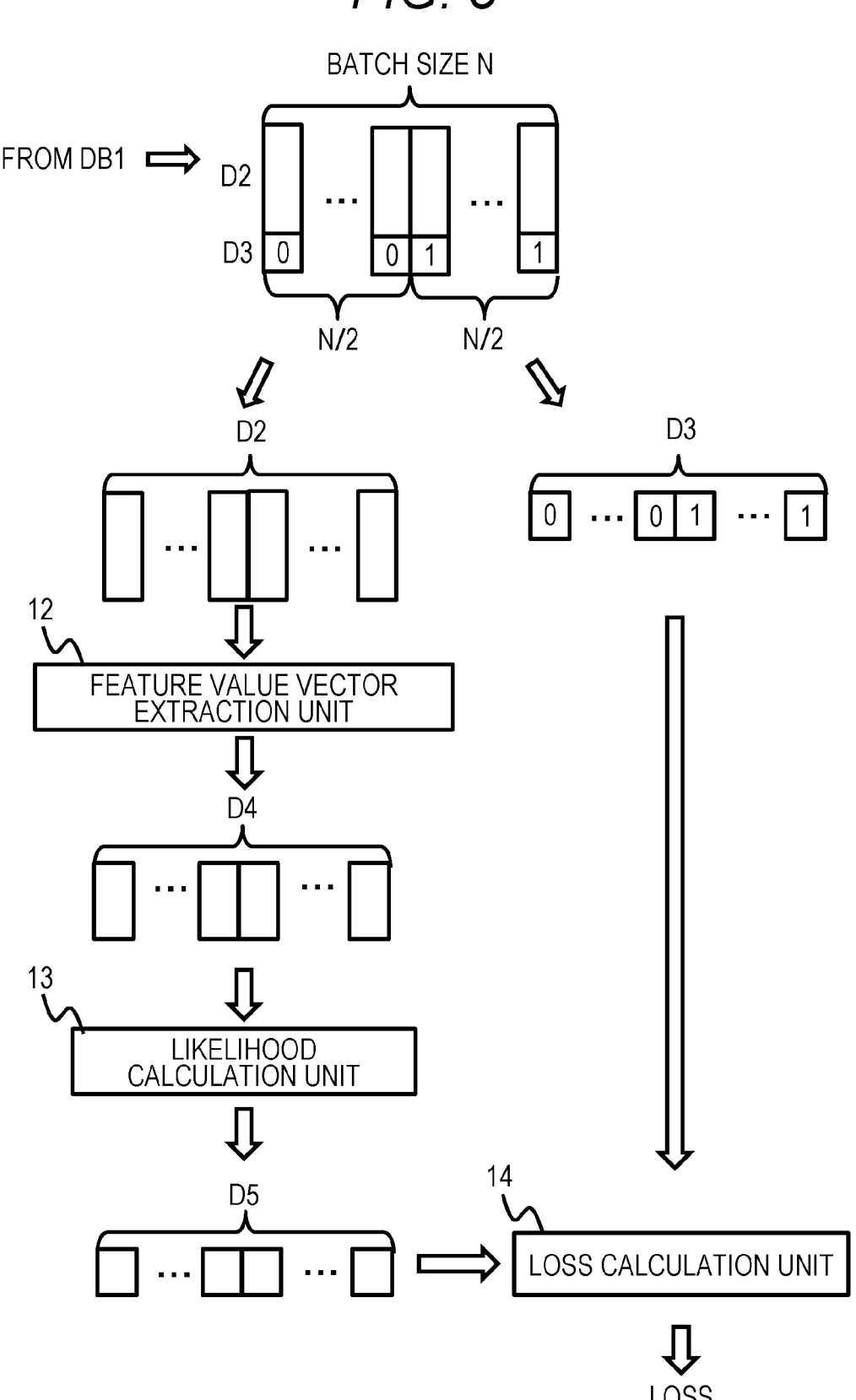
FIG. 3 is an explanatory diagram of processing of calculating a loss by using data of a training database.

FIG. 3 illustrates a method for calculating the likelihood and the loss by using the input from the training database DB1. First, a combination of the sensor data D2 and the concept classification D3 for N batch sizes is acquired from the training database DB1.

Here, for example, N/2 combinations of the sensor data D2 and the concept classification D3 from the detection target device are acquired, and the N/2 combinations from the device with the same-level concept as the detection target are also acquired. This is because, when there are a plurality of different devices having the same-level concept as the detection target device and when data for N batch sizes is randomly acquired from a set of the data of the detection target device and the data of the different devices having the same-level concept, the number of data from the detection target device is less than the number of data from the different devices having the same-level concept, and the learning of the machine learning model is slowed down.

Subsequently, the feature value vector extraction unit obtains N feature values D4 by extracting the feature value vector from the sensor data D2. The likelihood calculation unit 13 obtains N likelihoods D5 from the feature values D4 by calculating the likelihoods using the machine learning model.

The machine learning model may be a model in which the parameters are updated using the loss defined by the function of the likelihood, and for example, a normalizing flow (NF), a Gaussian mixture model (GMM), or Mahalanobis distance can be used.

The N likelihoods D5 and the concept classification D3 corresponding to each likelihood D5 are input to the loss calculation unit 14. The loss calculation unit 14 calculates and outputs the loss by using the loss function. The loss function is given by, for example, the following Equation 1.

$$L = \frac{1}{N_{target}} \sum_{x \in target} NLL(x) - k \cdot \frac{1}{N_{outlier}} \sum_{x \in outlier} NLL(x) \cdot I[NLL(x) < c]$$

$N_{target}$ is the number of combinations N/2 of the likelihood D5 and the concept classification D3 from the detection target device, which are included in the batch. $N_{outlier}$ is the number of samples that satisfy a condition in an indicator function I among the number of combinations N/2 of the likelihood D5 and the concept classification D3 from the different devices having the same-level concept as the detection target, which are included in the batch. NLL(x) is the negative log-likelihood of the feature value D4. k is a hyperparameter of $0 \leq k \leq 1$, and a ratio between an effect of increasing the likelihood of the data of the detection target device in a first term of Equation 1 and an effect of decreasing the likelihood of the data of the detection target device in a second term can be adjusted by adjusting k. The effect of increasing the likelihood of the data of the detection target device in the first term can be enhanced by decreasing k.

When the GMM is used as the machine learning model, for example, k needs to be smaller than 1 (k<1). The indicator function I[NLL(x)<c] is 1 when NLL(x)<c and is 0 when NLL(x)≥c. c is a threshold value, and is determined by, for example, a method to be illustrated below. Both the feature value from the detection target device and the feature value from the device with the same-level concept as the detection target are provided to the likelihood calculation unit, and the loss function is given as illustrated in the following Equation 2.

$$L = \frac{1}{N} \sum_{x} NLL(x) \qquad \text{[Math. 2]}$$

The value of NLL(x) when the model is updated several times so as to minimize this loss function is used as the threshold value c.

Figure 4:
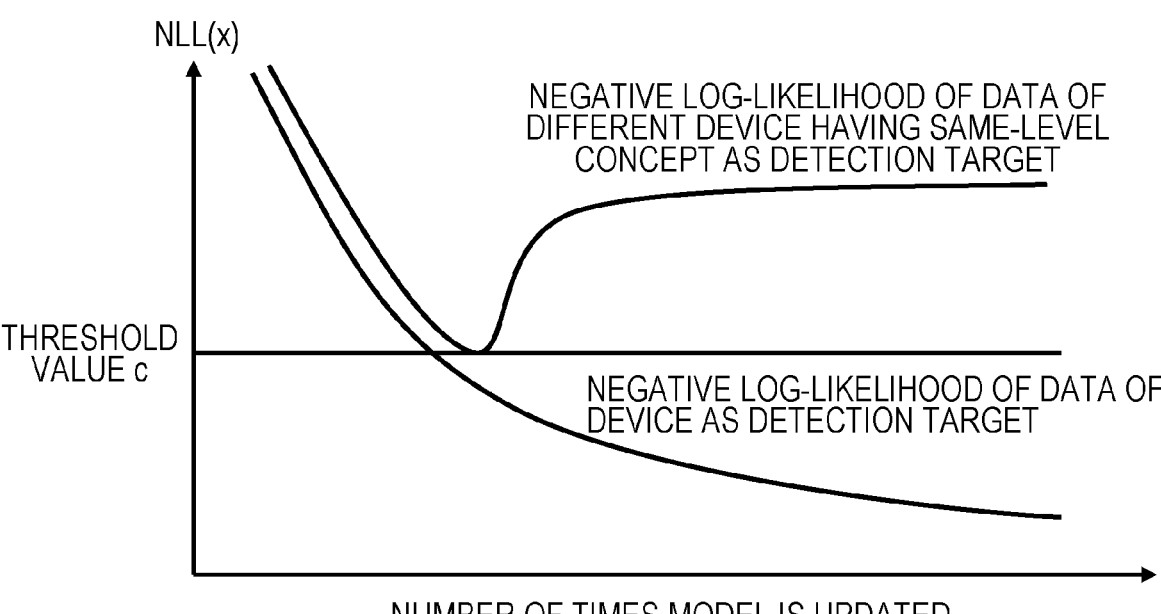
FIG. 4 is an explanatory diagram illustrating a relationship between a negative log-likelihood and the number of times a model is updated.

FIG. 4 is a graph representing the transition of the negative log-likelihood of each data point when the model is updated by using Equation 1. A vertical axis of FIG. 4 indicates NLL(x), and a horizontal axis of FIG. 4 indicates the number of times the model is updated. The upper side of the graph in FIG. 4 represents a change in the negative log-likelihood of the data of the different device(s) having the same-level concept as the detection target. The lower side of the graph in FIG. 4 represents a change in the negative log-likelihood of the data of the device as the detection target.

By using Equation 1, it is possible to impose a constraint that the NLL(x) of the data of the detection target device is smaller than the NLL(x) of the data of a different device having the same-level concept as the detection target. Since the abnormality degree calculation unit 17 calculates an abnormality degree with the negative log-likelihood as the abnormality degree, the constraint corresponds to a case where the model is learned such that the abnormality degree of the data of the detection target device is decreased, and the abnormality degree of the data of the different device having the same-level concept as the detection target is increased.

Furthermore, it is possible to prevent NLL(x) of the data of the different device having the same-level concept as the detection target device from diverging by using the indicator function I.

Figure 5:
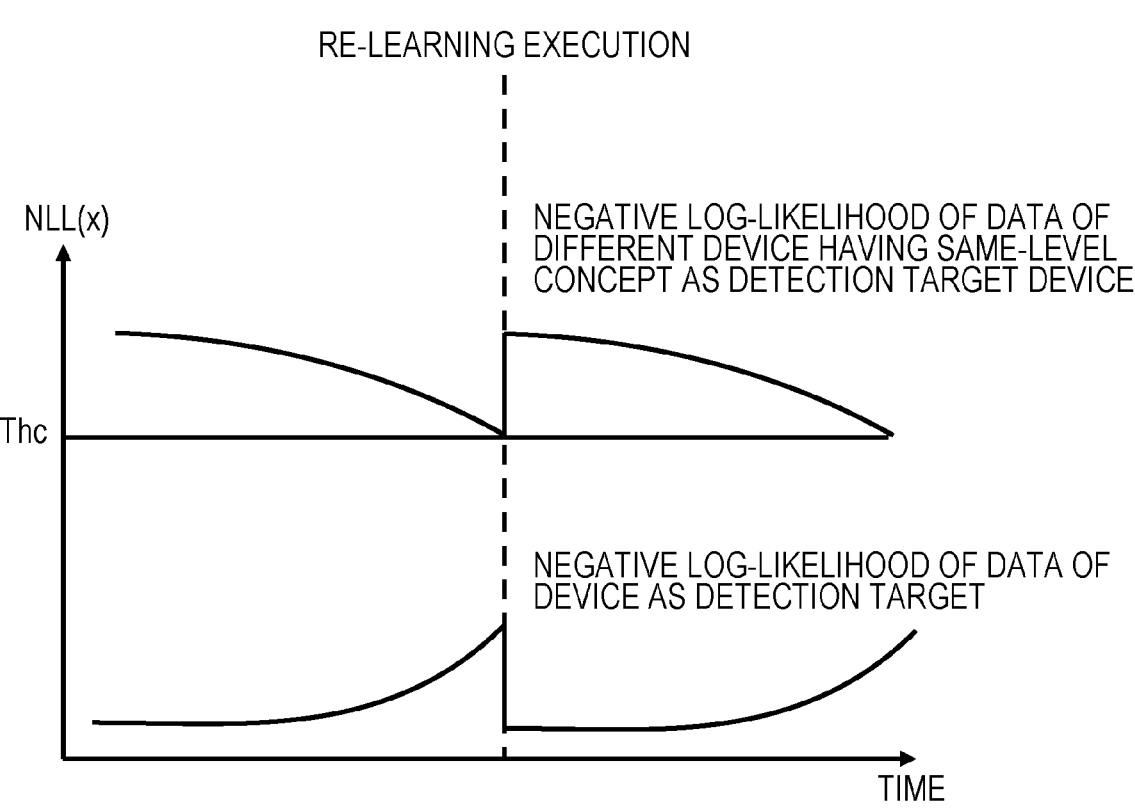
FIG. 5 is an explanatory diagram of a method for determining whether re-learning is necessary.

A method for determining whether re-learning is necessary by the re-learning necessity determination unit 16 will be described with reference to FIG. 5. A vertical axis of FIG. 5 indicates NLL(x), and a horizontal axis of FIG. 5 indicates a time. An upper side of the graph in FIG. 5 represents the negative log-likelihood of the data of the different device having the same-level concept as the detection target device. A lower side of the graph in FIG. 5 represents the negative log-likelihood of the data of the device as the detection target.

When the abnormality degree calculation system is operated by using the model created at the time of model learning, the distribution of the data of the detection target device and the data of the different device having the same-level concept as the detection target device transitions from the time of learning with the passage of a time.

Thus, as illustrated on the left side of the graph in FIG. 5 at a point in time of "re-learning execution", it is considered that the negative log-likelihood of the data of the detection target device is large, and the negative log-likelihood of the different device having the same-level concept as the detection target is small.

When the negative log-likelihood of the data of the detection target device is large, since there is a possibility that an abnormality occurs in the detection target device, the re-learning is performed only when the negative log-likelihood of the data of the different device having the same-level concept as the detection target device is small. For example, a user sets a re-learning necessity determination threshold value Thc, and the re-learning is executed when the negative log-likelihood of the data from the different device having the same-level concept as the detection target device is less than the re-learning necessity determination threshold value Thc.

Figure 6:
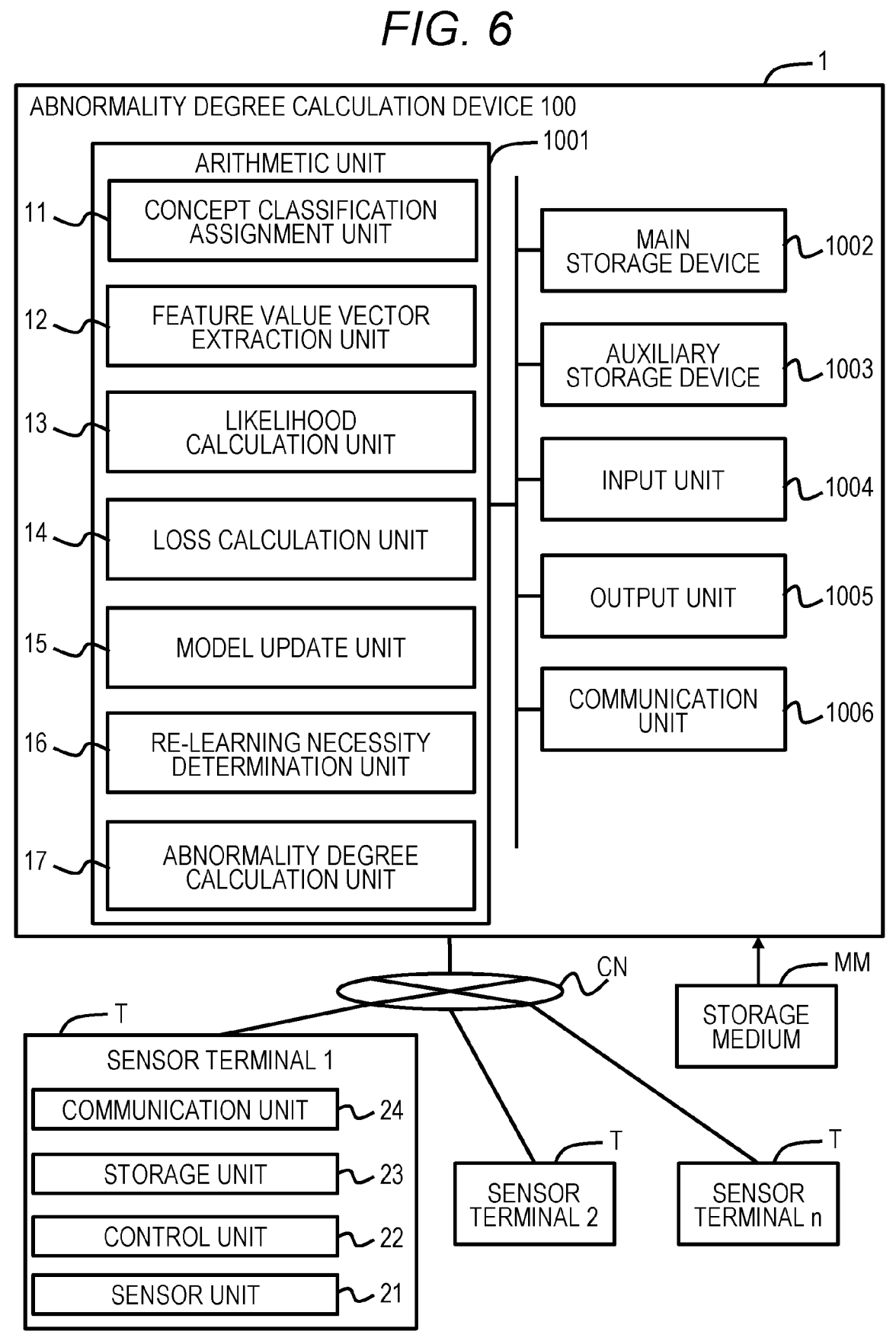

FIG. 6 illustrates a hardware configuration and a software configuration of the abnormality degree calculation system. A computer can be used as an abnormality degree calculation device 100 by causing the computer to execute a predetermined computer program. Although FIG. 6 illustrates an example in which an abnormality degree calculation device 100 is constructed by one computer, one or a plurality of abnormality degree calculation devices 100 may be formed from a plurality of computers instead. The computer may be a virtual computer.

The abnormality degree calculation device 100 is connected to n sensor terminals T attached to n devices via a communication network CN.

The sensor terminal T is, for example, a portable recording terminal.

The abnormality degree calculation device 100 is, for example, a computer that includes an arithmetic unit 1001, a main storage device 1002, an auxiliary storage device 1003, an input unit 1004, an output unit 1005, and a communication unit 1006.

The arithmetic unit 1001 includes one or a plurality of microprocessors, and realizes functions such as the concept classification assignment unit 11, the feature value vector extraction unit 12, the likelihood calculation unit 13, the loss calculation unit 14, the model update unit 15, the re-learning necessity determination unit 16, and the abnormality degree calculation unit 17 described in FIG. 1 by reading a predetermined computer program stored in the auxiliary storage device 1003 into the main storage device 1002 and executing the program.

The input unit 1004 can include, for example, a keyboard, a touch panel, a pointing device, and the like, and receives an input from a user using the abnormality degree calculation device 100. The output unit 1005 can include, for example, a monitor display, a speaker, a printer, and the like, and provides information to the user.

The communication unit 1006 communicates with the sensor terminals T via the communication network CN. The communication unit 1006 can also communicate with other computers (not illustrated).

A storage medium MM is, for example, a storage medium such as a flash memory or a hard disk, and transfers and stores a computer program or data to the abnormality degree calculation device 100, or reads and stores the computer program or data from the abnormality degree calculation device 100. The storage medium MM may be directly connected to the abnormality degree calculation device 100, or connected, via the communication network CN, to the abnormality degree calculation device 100.

A configuration of the sensor terminal T will be described. The sensor terminal T includes, for example, a sensor unit 21, a control unit 22, a storage unit 23, and a communication unit 24.

The sensor unit 21 is a device that acquires sensor data from a device such as a microphone, an acceleration sensor, a magnetic sensor, or a camera. The data acquired by the sensor unit 21 is stored in the storage unit 23. The control unit 22, which controls the sensor terminal T, transmits sound data stored in the storage unit 23 to the abnormality degree calculation device 100. The abnormality degree calculation device 100 can calculate the abnormality degree based on the received sensor data.

Figure 8:
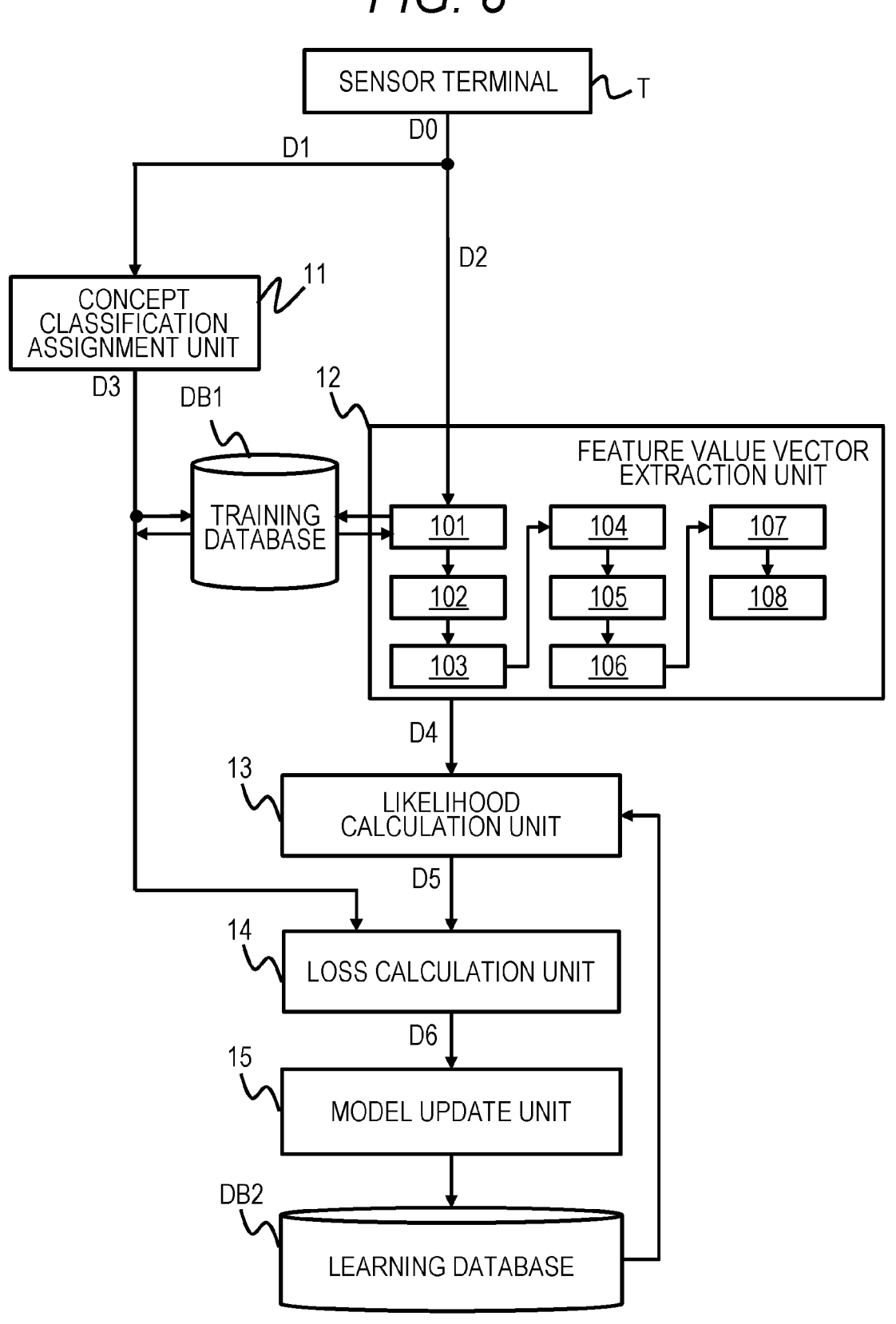
FIG. 8 is a block configuration diagram at the time of learning.
Figure 9:
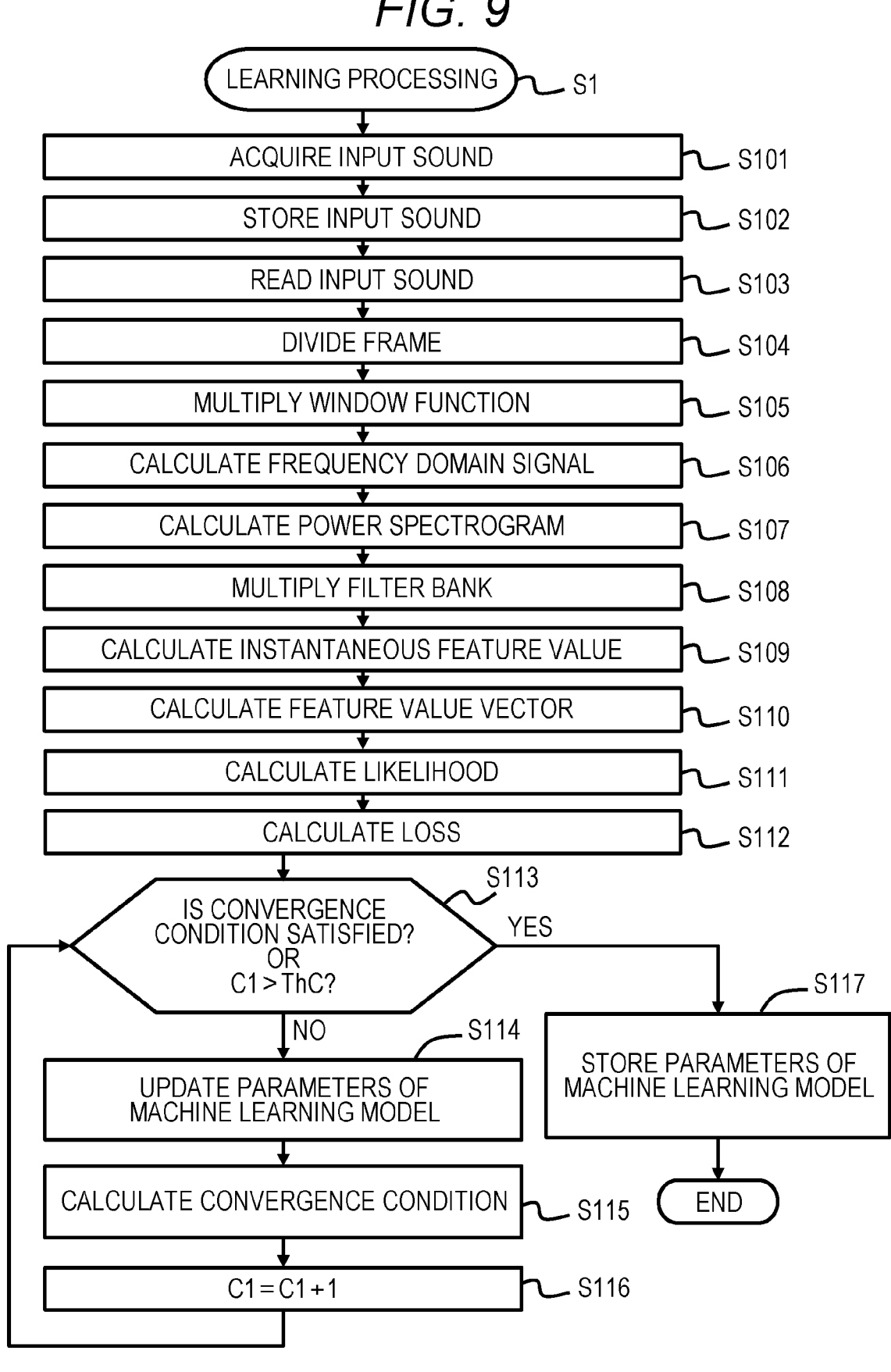
FIG. 9 is a processing flow of an abnormality degree calculation system at the time of learning.

FIG. 7 is a block configuration diagram of the feature value vector extraction unit 12. FIG. 8 is a block configuration diagram of the abnormality degree calculation device 100 at the time of learning, and FIG. 9 is a processing flow in the abnormality degree calculation device 100 at the time of learning.

A description of the configuration of the feature value vector extraction unit 12 is provided. Although a case where the sensor unit 21 of the sensor terminal T is the microphone will be described, the device is not limited to the microphone, and any device, such as an acceleration sensor, a magnetic sensor, or a camera that can acquire the sensor data from the device M, may be used. When a sensor other than the microphone is used, it is assumed that a known feature value extraction method is used. When the sensor unit 21 is another sensor, a known feature value vector extraction method corresponding to a kind of the sensor is used.

An input sound acquisition unit 101 converts an analog input signal input from the microphone into a digital input signal by an analog-to-digital (A/D) converter (S101), and stores the digital input signal in the training digital input signal database DB1 (S102).

A frame division unit 102 divides the digital input signal for each specified number of time points (hereinafter, referred to as a frame size) for the digital input signal extracted from the training digital input signal database DB1, and outputs the frame signal (S104). The frames may overlap.

A window function multiplication unit 103 outputs a window function multiplication signal by multiplying the input frame signal by a window function (S105). For example, a Hann window is used as the window function.

A frequency domain signal calculation unit 104 outputs a frequency domain signal by performing a Short-time Fourier transform on the input signal after the window function multiplication (S106). When the frame size is N, the frequency domain signal is a set of M complex numbers corresponding to (N/2+1)=M frequency bins. The frequency domain signal calculation unit 104 can also use a frequency conversion method, such as constant Q conversion (CQT), instead of the Short-time Fourier transform.

A power spectrogram calculation unit 105 outputs a power spectrogram based on the input frequency domain signal (S107). A filter bank multiplication unit 106 outputs a mel power spectrogram by multiplying the input power spectrogram by a mel filter bank (S108). The filter bank multiplication unit 106 may use a filter bank, such as a ⅓ octave band filter, instead of the mel filter bank.

An instantaneous feature value calculation unit 107 outputs a logarithmic mel power spectrogram by applying a logarithm to the input mel power spectrogram (S109). Note that a mel frequency cepstrum coefficient (MFCC) may be calculated instead of the logarithmic mel power spectrogram. In this case, instead of the filter bank multiplication unit 106 and the instantaneous feature value calculation unit 107, a logarithmic value of the power spectrogram is calculated, the filter bank is multiplied, a discrete cosine transform is performed, and the MFCC is output.

A feature value time-series calculation unit 108 outputs the feature value D4 by connecting adjacent L frames to the input logarithmic mel power spectrogram or to the MFCC (S110). Instead of the logarithmic mel power spectrogram or the MFCC, the time series (delta) of time difference or time derivative thereof may be input, and the adjacent L frames may be connected to output the feature value D4.

The adjacent L frames may be connected to output the feature value D4 by inputting the time difference, the time difference of the time series of the time derivative, or the time series (delta) of the time derivative. Furthermore, a combination of any of these values may be selected to be connected in an axial direction of the feature value, and the adjacent L frames may be connected to output the feature value D4. The feature value D4 generated by the feature value vector extraction unit 12 is input to the likelihood calculation unit 13.

The likelihood calculation unit 13 calculates the likelihood D5 based on the feature value D4. The calculated likelihood D5 is input to the loss calculation unit 14 (S111).

The loss calculation unit 14 calculates the value D6 of a predetermined loss function, defined as the likelihood of the data of the detection target device and the likelihood of the data of the different device with the same-level concept as the detection target device, based on the likelihood D5 and the concept classification D3. The loss D6 calculated by the loss calculation unit 14 is input to the model update unit 15 (S112).

The model update unit 15 repeatedly trains the parameters of the machine learning model such that the value of the loss D6 is minimized (S113 to S116). The parameters of the machine learning model are stored in the learning database DB2 (S117).

That is, the model update unit 15 determines whether a convergence condition is satisfied or whether the number of times of iterations C1 of this processing exceeds an upper limit ThC (S113).

When the convergence condition is not satisfied, or when the number of times of iterations C1 is less than or equal to the upper limit ThC, the model update unit 15 updates the parameters of the machine learning model (S114), calculates the convergence condition (S115), and increments the number of times of iterations C1. The processing returns to step S112.

The model update unit 15 stores the parameters of the machine learning model in the learning database DB2 (S117).

Figure 10:
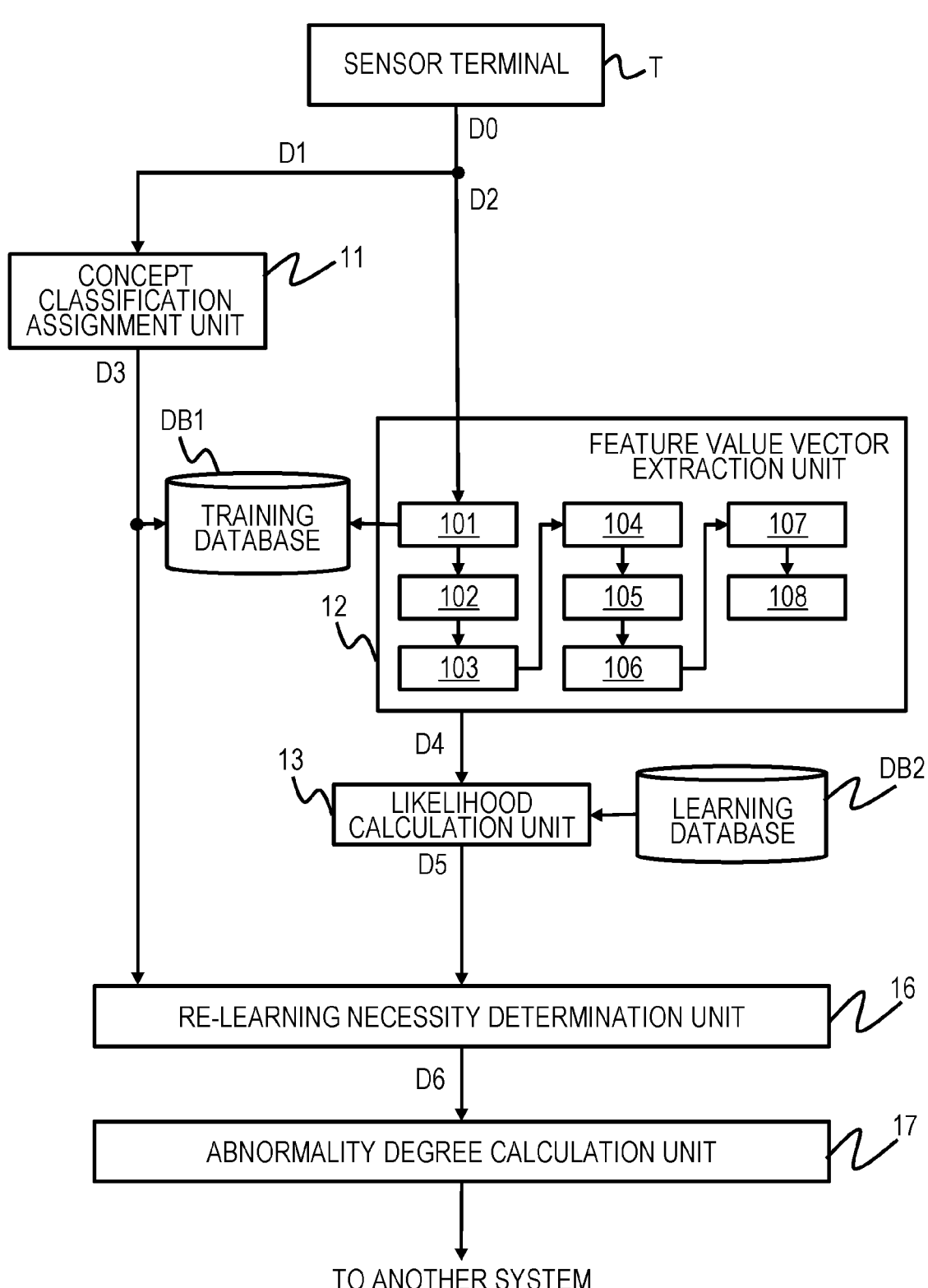
FIG. 10 is a block configuration diagram at the time of calculation of an abnormality degree.

FIG. 10 is a block diagram of the abnormality degree calculation device 100 when the abnormality degree is calculated. FIG. 11 is a processing flow in the abnormality degree calculation device 100 when the abnormality degree is calculated. The calculation of the abnormality degree will be described with reference to FIGS. 10 and 11.

The abnormality degree calculation device 100 includes the re-learning necessity determination unit 16 and the abnormality degree calculation unit 17 instead of the loss calculation unit 14 and the model update unit 15.

When the abnormality degree of the feature value D4 extracted from the sensor data D2 is calculated, the likelihood calculation unit 13 reads the parameters from the learning database DB2 (S201).

Since the contents of steps S101 to S110 are already described, redundant descriptions will be omitted. In these steps S101 to S110, the feature value D4 for the sensor data D2 acquired from the sensor terminal T is generated and input to the machine learning model of the likelihood calculation unit 13. In the following description, the redundant description will be omitted. Note that this is because, in S102, input sound is stored in the training database DB1 even at the time of calculation of the abnormality, and the training data at the time of re-learning is stored.

The likelihood calculation unit 13 calculates the likelihood D5 from the feature value D4, and inputs the calculated likelihood D5 to the re-learning necessity determination unit 16 (S111).

The re-learning necessity determination unit 16 performs re-learning when the negative log-likelihood of the different device having the same-level concept as the detection target device exceeds a predetermined re-learning necessity determination threshold value Thc by using the likelihood D5 and the concept classification D3, and inputs the likelihood D7 of the data of the detection target device to the abnormality degree calculation unit 17 when the negative log-likelihood is less than the predetermined re-learning necessity determination threshold value (S202).

The abnormality degree calculation unit 17 calculates the abnormality degree of the sensor data of the detection target device based on the likelihood D7 of the data of the detection target device (S203).

Here, as the machine learning model, for example, a configuration in which the normalizing flow (NF) is used will be disclosed.

The likelihood calculation unit 13 is constituted by a multi-layer neural network. The input of the likelihood calculation unit 13 includes as many elements as the number of dimensions of the feature value vector, and each of these elements receives each element of the feature value vector. An input layer is connected to a predetermined conversion function, a multi-layer neural network with the same number of elements at an input and an output, and a non-linear activation function (for example, ReLU function), and a final layer of the multi-layer neural network has the same number of elements as the input layer. At this time, the predetermined conversion function is determined such that the conversion from the input layer to the output of the multi-layer neural network is constituted by conversions that can be inversely converted. The likelihood calculation unit 13 calculates the likelihood from the output of the final layer of the multi-layer neural network, assuming that the output of the final layer of the multi-layer neural network follows a distribution with a known distribution function (e.g., a normal distribution). Furthermore, the likelihood of the input feature value vector D4 is calculated using a known random-variable conversion expression.

The loss calculation unit 14 calculates the loss D6 by using the loss function defined by the function of the likelihood D5, for example, Equation 1. At this time, the loss function is defined so as to increase the likelihood D5 of the data of the detection target device and decrease the likelihood D5 of the data of the different device having the same-level concept as the detection target device, for example, as in Equation 1.

The model update unit 15 updates the parameters of the machine learning model so as to minimize the loss D6 calculated by the loss calculation unit 14. Minimization can be performed by a known optimization algorithm such as SGD, Momentum SGD, AdaGrad, RMSprop, AdaDelta, or Adam.

According to the present embodiment having the above-described configuration, learning can be performed such that the normal data of the detection target device is regarded as normal data by increasing the likelihood of the normal data of the detection target device and the normal data of the different device having the same-level concept as the detection target device is regarded as abnormal data by decreasing the likelihood of the normal data of the different device.

Figure 12:
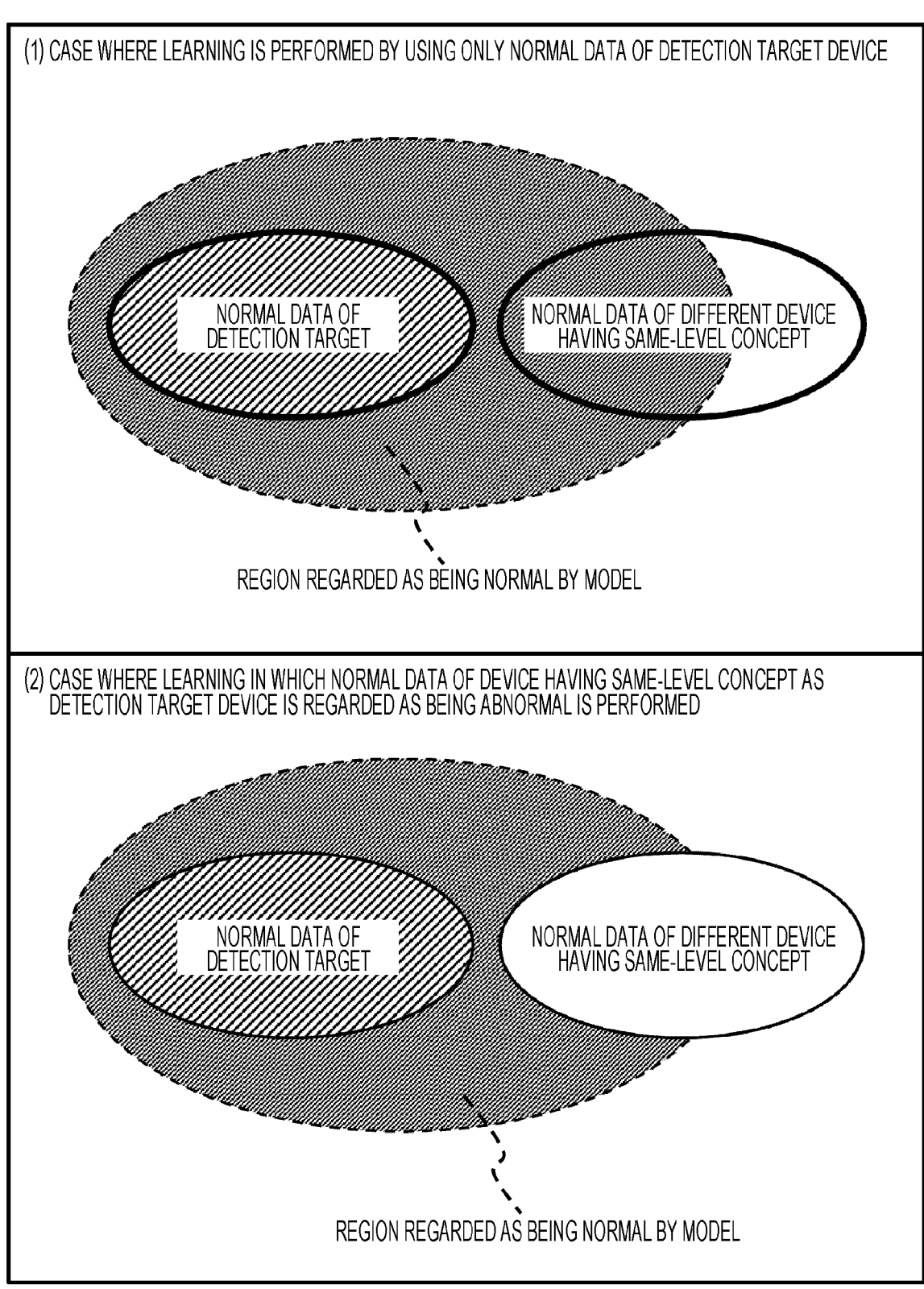
FIG. 12 is an explanatory diagram illustrating a difference between a method of the present invention and a method of the related art.

FIG. 12 illustrates the effects of the present embodiment. The upper side of FIG. 12 illustrates a case where the machine learning model is learned by using only the normal data of the detection target device. The lower part of FIG. 12 illustrates a case in which the machine learning model is trained to treat normal data from the device with the same-level concept as the detection target device as abnormal. A thin shaded portion indicates a region deemed normal by the machine learning model of the present embodiment.

As illustrated in (1) of FIG. 12, when learning is performed by using only the normal data of the detection target device, since the normal data of the detection target device and the normal data of the different device having the same-level concept as the detection target device have similar normal distributions, the learned model also regards a part of the normal data of the different device having the same-level concept as the detection target device as the normal data and gives a high likelihood.

However, in the present embodiment, the learned model regards the normal data of the different device having the same-level concept as the detection target device as the abnormal data and assigns a low likelihood. Thus, according to the present embodiment, as illustrated in (2) of FIG. 12, the region regarded as being normal by the machine learning model can be reduced, and the normal distribution of the data of the detection target device can be estimated more accurately.

Accordingly, according to the present embodiment, the normal distribution of the data of the detection target device can be estimated more accurately by using the normal data of the different device having the same-level concept as the detection target device, and sufficient detection accuracy can be obtained even when the amount of data of the detection target device is small.

Second Embodiment

A second embodiment will be described with reference to FIGS. 13 and 14. In the following embodiments, including the present embodiment, differences from the first embodiment will be mainly described.

Figure 13:
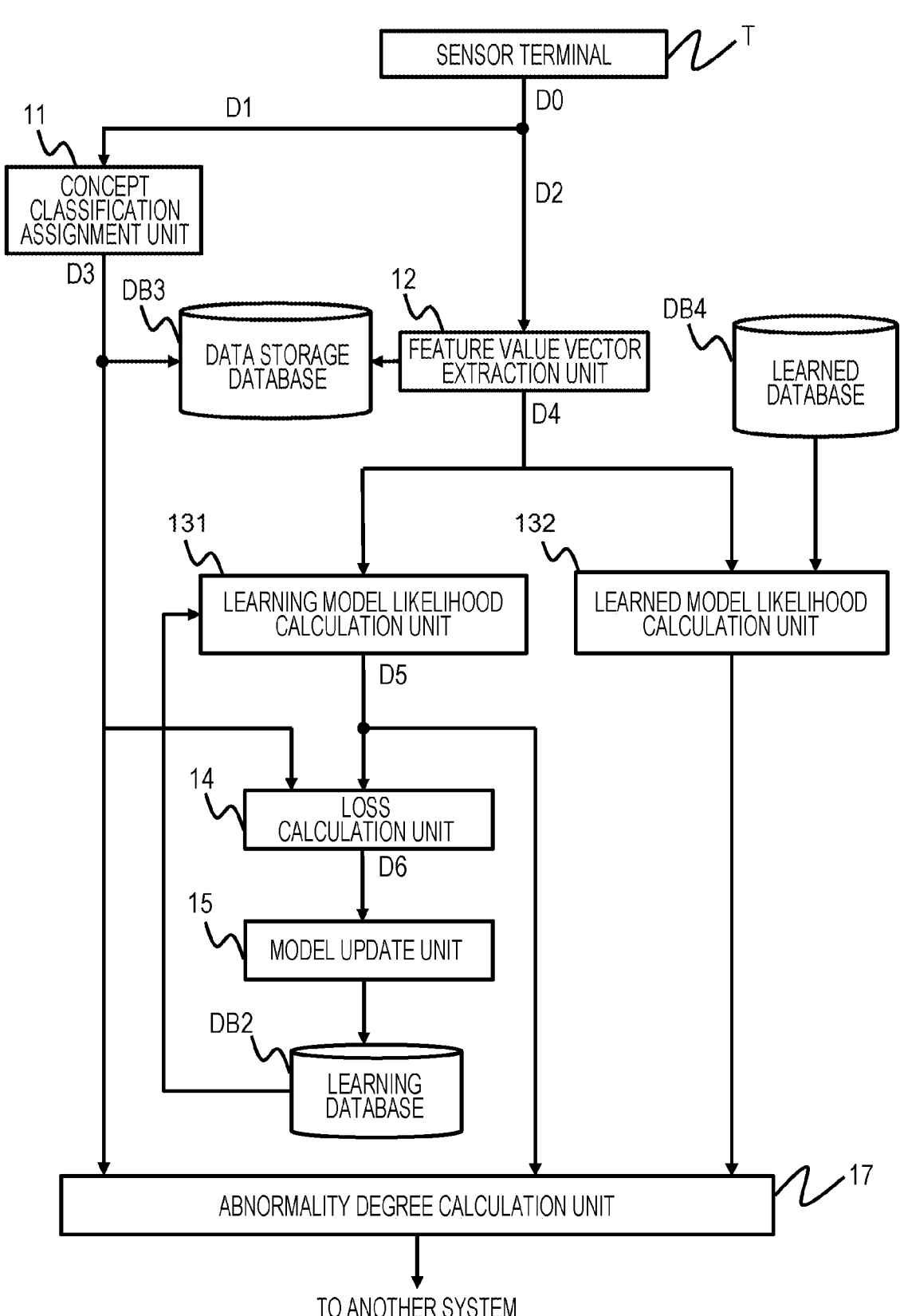
FIG. 13 is a block configuration diagram at the time of calculation of the abnormality degree according to a second embodiment.
Figure 14:
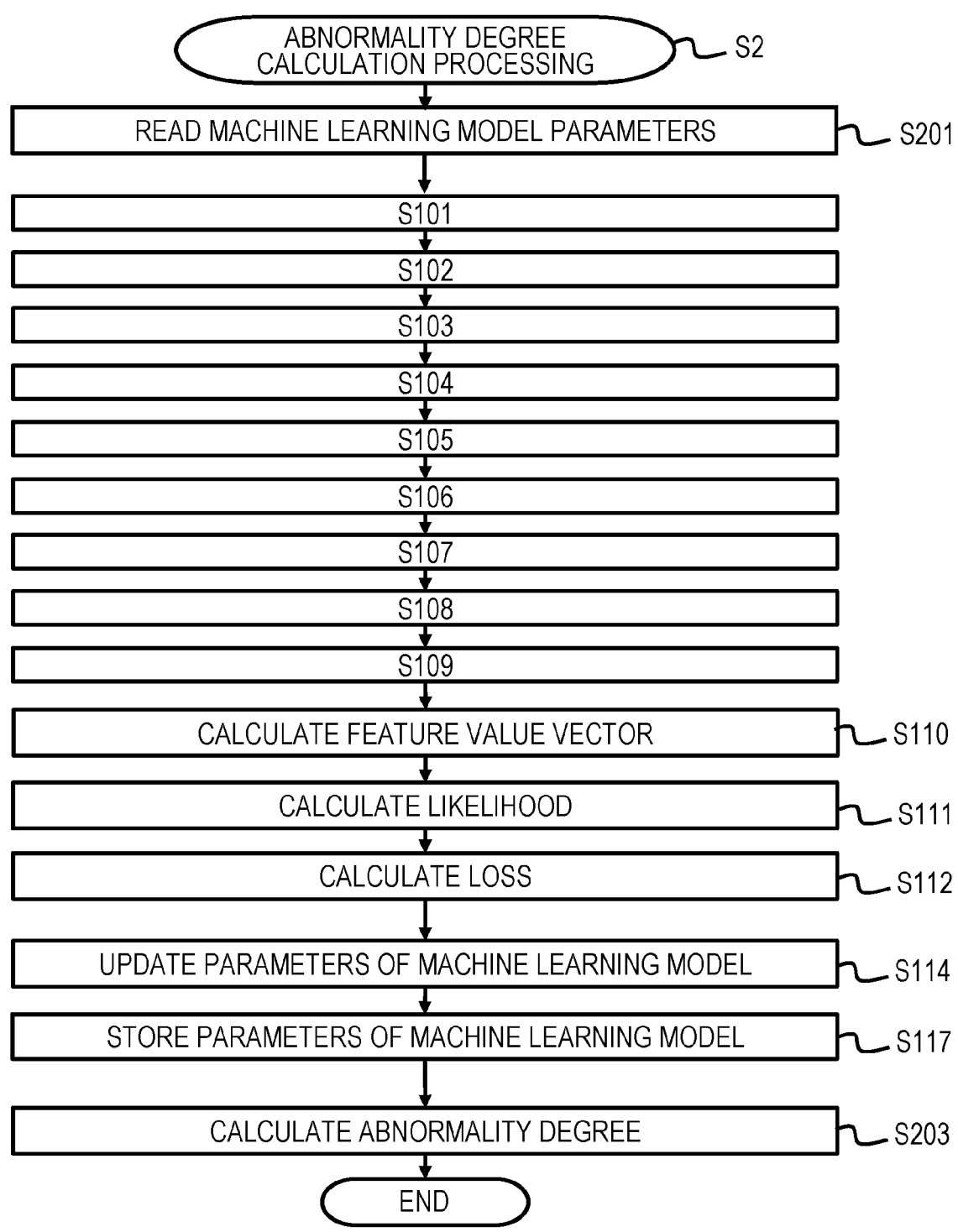
FIG. 14 is a processing flow of the abnormality degree calculation system at the time of calculation of the abnormality degree.

FIG. 13 is a block diagram when sequential learning processing is performed. FIG. 14 is a processing flow of the sequential learning processing.

In the present embodiment, first, the machine learning model is trained using the same batch learning as the learning method described with reference to FIGS. 7 and 8 in the first embodiment. The difference between the present embodiment and the first embodiment is that the abnormality degree is calculated using the learned model, the learning model is updated using the data obtained at the time of the operation, and the abnormality degree is also calculated from the updated model.

The input D0 from the sensor terminal T is divided into the type number D1 and the sensor data D2, the type number D1 is converted into the concept classification D3 by the concept classification assignment unit 11, and the sensor data D2 is converted into the feature value D4 by using characterized by using the feature value vector extraction unit 12. The sensor data D2 and the concept classification D3 are stored in a data storage database DB3 in order to specify a cause of the abnormality when the abnormality occurs.

In the present embodiment, there are two kinds of likelihood calculation units. One likelihood calculation unit is a learning model likelihood calculation unit 131 that calculates the likelihood of the feature value D4 using a model obtained from a learning database that is updated sequentially. The other likelihood calculation unit is a learned model likelihood calculation unit 132 that calculates the likelihood of the feature value D4 by using the model obtained from a learned database DB4 that stores the learned model.

The loss calculation unit 14 calculates the value of the loss from the likelihood calculated by the learning model likelihood calculation unit 131 by using a predetermined loss function defined as the function of the likelihood. The predetermined loss function is a loss function that gives a high likelihood to the data of the detection target device and gives a low likelihood to the data of the different device having the same-level concept as the detection target device.

Note that, in the sequential learning processing used in the present embodiment, since a sequential model is updated by using the sensor data that is sequentially input, learning cannot be performed by using a batch, unlike the batch learning. Thus, among n pieces of sensor data input from the n devices through the sensor terminals T, one piece of data of the detection target device and one piece of data of the different device having the same-level concept as the detection target device are extracted, and the loss is calculated from the likelihood. For example, when Equation 1 is used, $N_{target}$ is 1, $N_{outlier}$ is 1 when NLL(x)<c, and Equation 1 is only the first term when NLL(x)≥c.

The model update unit 15 updates the parameters based on the value of the loss, and stores the obtained parameters in the learning database DB2. A known optimization algorithm for sequentially updating parameters, such as online gradient descent (OGD), can be used to minimize the loss function.

The abnormality degree calculation unit 17 calculates the abnormality degree from the likelihoods calculated by the learning model likelihood calculation unit 131 and the learned model likelihood calculation unit 132, respectively. When only the likelihood from the sequentially updated model is used, since it is difficult to cope with abnormalities caused over a long period of time, such as deterioration over time, the likelihood from the learned model at the start of operation is added, and the abnormality is coped with. For example, a function such as Equation 3 can be used to calculate the abnormality degree using both the likelihood obtained from the learned model and the likelihood obtained from the sequentially updated model.

$$A = A_1 + \alpha A_2 \qquad \text{[Equation 3]}$$

A is the final abnormality degree. A1 is an abnormality degree calculated using the model obtained from the learning database. A2 is an abnormality degree calculated using the model obtained from the learned database. $\alpha$ is a parameter determined at the time of operation.

The present embodiment, having the aforementioned configuration, achieves the same effects as those of the first embodiment. Furthermore, in the present embodiment, since the model is sequentially learned while the abnormality degree is calculated, it is possible to learn a model that is robust against changes in the normal distributions of the devices.

In the present embodiment, the likelihood given by the model at the start point in time of operation is also simultaneously calculated by using the learning database DB2 at a start point in time of operation as the learned database DB4, and is reflected in the final abnormality degree. Thus, it is also possible to cope with the detection of the abnormality caused over a long period of time, such as deterioration.

Furthermore, the present embodiment can also cope with a case where the input data having the same-level concept changes, such as a case where the different device having the same-level concept is newly added.

Third Embodiment

A third embodiment will be described with reference to FIGS. 15 to 18. In the first embodiment and the second embodiment, all the devices having the same higher-level concept, for example, the same model as the detection target device, and having lower-level concepts, for example, types different from the detection target, are handled as the different devices having the same-level concept as the detection target device.

On the other hand, among the different devices having the same-level concept, there may be devices having a plurality of kinds of lower-level concepts, for example, types, and having different similarity degrees from the data of the detection target device for each kind. As an example, it is considered that there are devices having the same model as the detection target device, different types, but the same or different drive systems. In the present embodiment, it is an object to further improve the detection accuracy by utilizing a lower-level concept.

Figure 15:
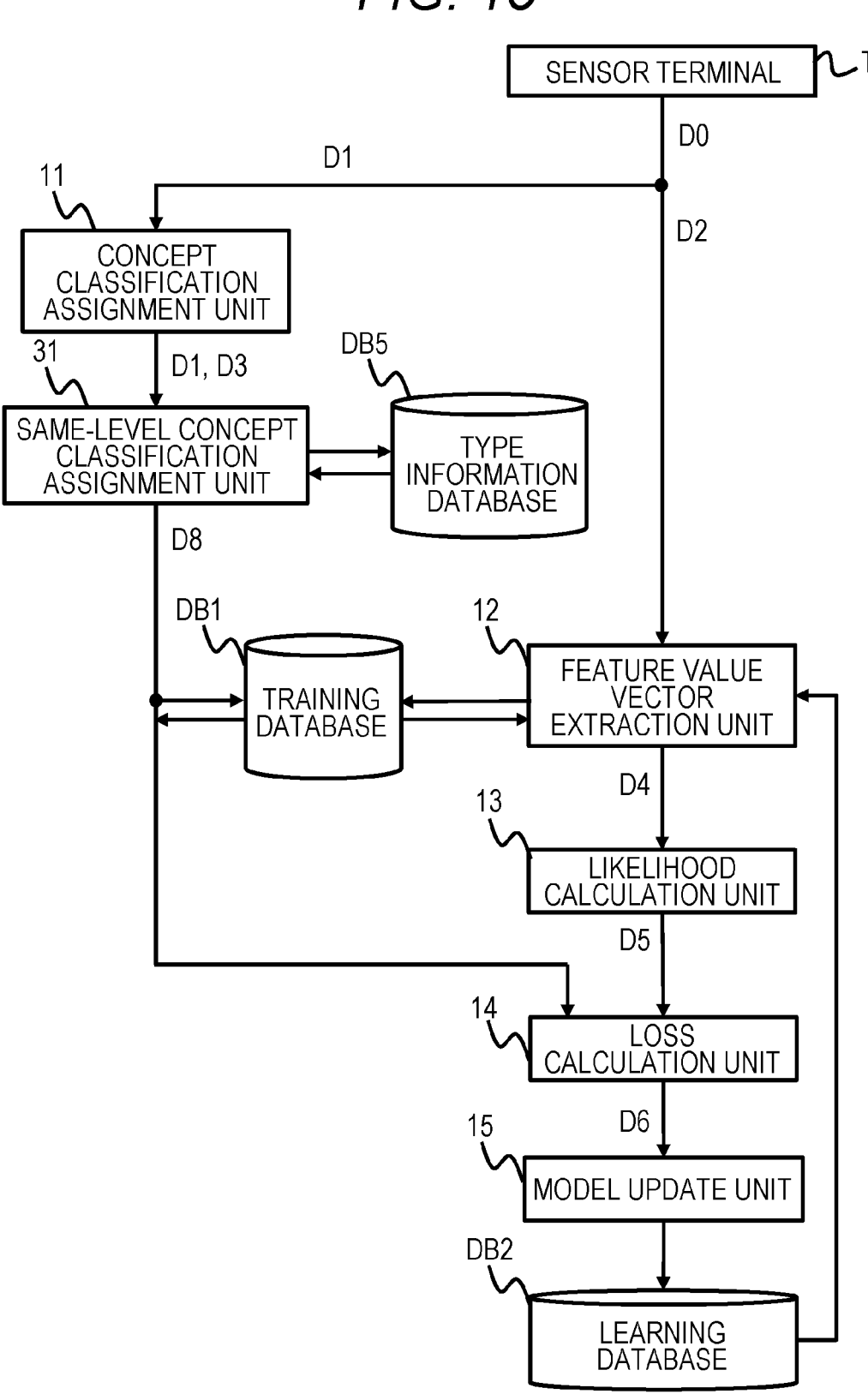
FIG. 15 is a block configuration diagram at the time of learning according to a third embodiment.
Figure 16:
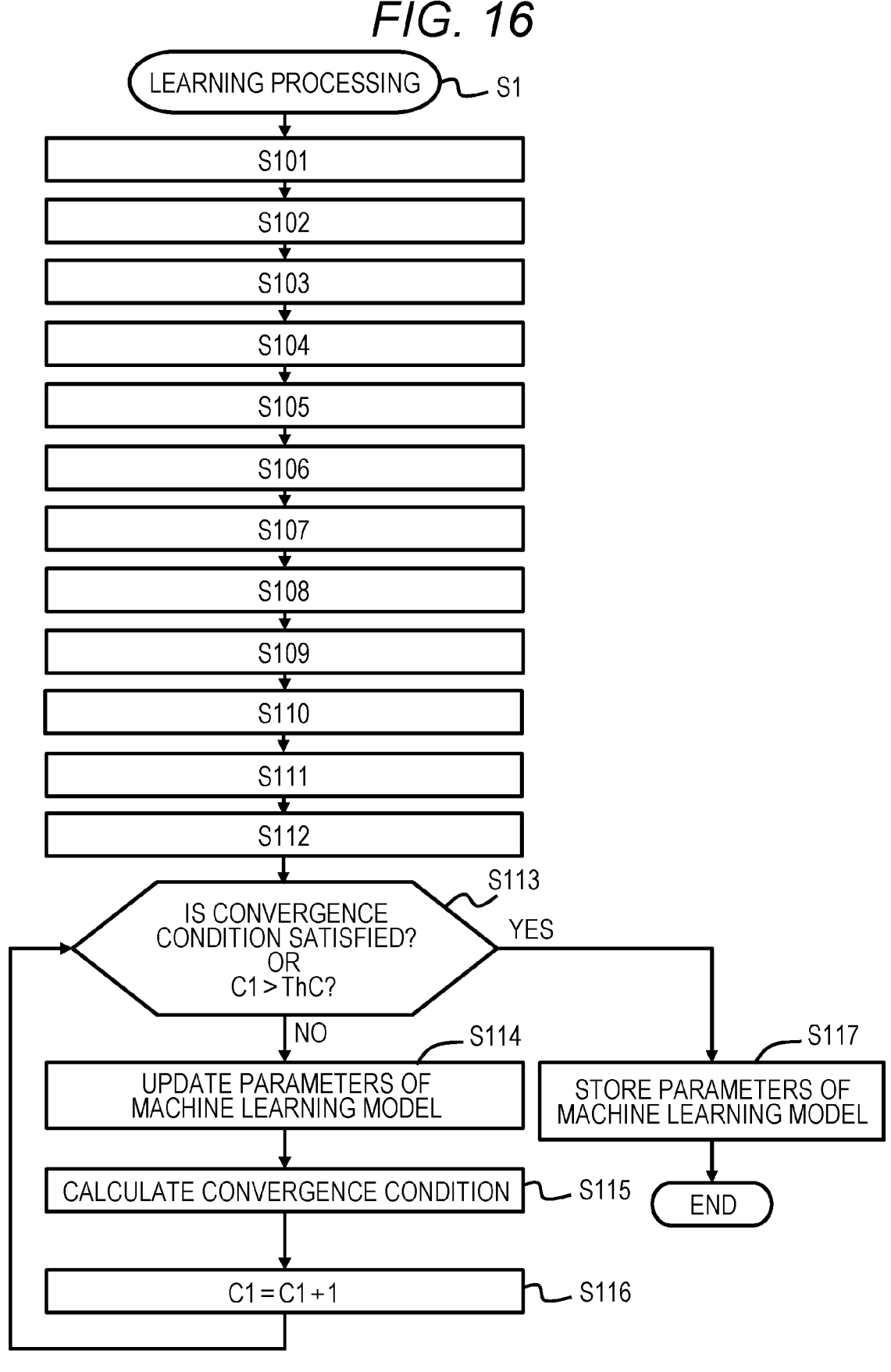
FIG. 16 is a processing flow of the abnormality degree calculation system at the time of learning.

The processing at the time of learning in the present embodiment will be described with reference to FIGS. 15 and 16. The type number D1 of the inputs D0 from the sensor terminals T is converted into the concept classification D3 by the concept classification assignment unit 11. The sensor data D2 is converted into the feature value D4 by the feature value vector extraction unit 12. Here, unlike in the first second embodiments, the concept classification assignment unit 11 outputs both the concept classification D3 and the type number D1.

The sensor data D2 is converted into the feature value D4 by the feature value vector extraction unit 12. When the set of the different devices having the same-level concept as the detection target device includes a plurality of types, a same-level concept classification assignment unit 31 investigates a relationship between each type of the different device having the same-level concept and the type of the detection target device, and gives a weight w to each type of the different device having the same-level concept. This weight w may be set based on, for example, a source of sound produced from the detection target device, that is, the commonality of elements related to the sound source. For example, the sensor data differs between a case where the drive system of the device is an electric motor and a case where the drive system is a hydraulic motor. Thus, in the present embodiment, a high value is given to the type of the different device having the same drive type as the detection target device as having a high similarity degree to the detection target device, and a low value is given to the type of the different device having a different drive type from the detection target device as having a low similarity degree to the detection target device.

In addition to the sensor data D2 and the concept classification D3, the training database DB1 stores the weight w corresponding to each type of the different device having the same-level concept.

The likelihood calculation unit 13 calculates the likelihood D5 from the feature value D4 calculated by the feature value vector extraction unit 12 by using the model obtained from the learning database DB2.

The loss calculation unit 14 calculates the loss D6 from the likelihood calculated by the likelihood calculation unit 13 by using the loss function that is defined as the function of the likelihood, gives a high likelihood to the data of the detection target device, and gives a low likelihood to the data of the different device having the same-level concept as the detection target device. For example, Equation 4 obtained by modifying Equation 1 can be used as the loss function used here.

$$L = \frac{1}{N_{target}} \sum_{x \in target} NLL(x) - k \cdot \frac{1}{N_{outlier}} \sum_{x \in outlier} \omega_i \cdot NLL(x) \cdot I[NLL(x) < c]$$

Here, $w_i$ is a weight of an i-th type determined in the same-level concept classification assignment unit 31.

The model update unit 15 updates the parameters of the machine learning model so as to minimize the loss D6 calculated by the loss calculation unit 14. Minimization can be performed by a known optimization algorithm such as SGD, Momentum SGD, AdaGrad, RMSprop, AdaDelta, or Adam.

Figure 17:
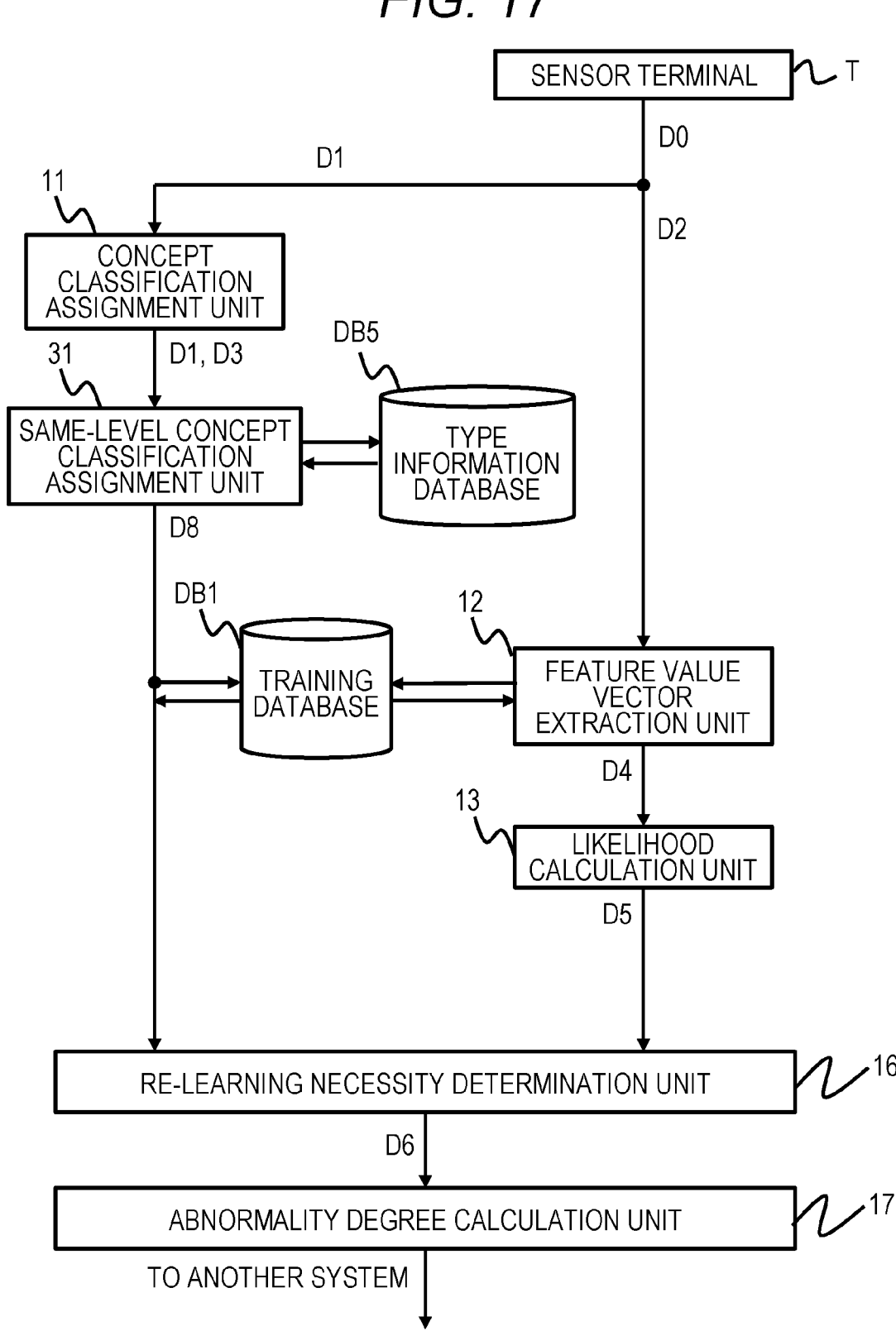
FIG. 17 is a block configuration diagram at the time of calculation of the abnormality degreed.
Figure 18:
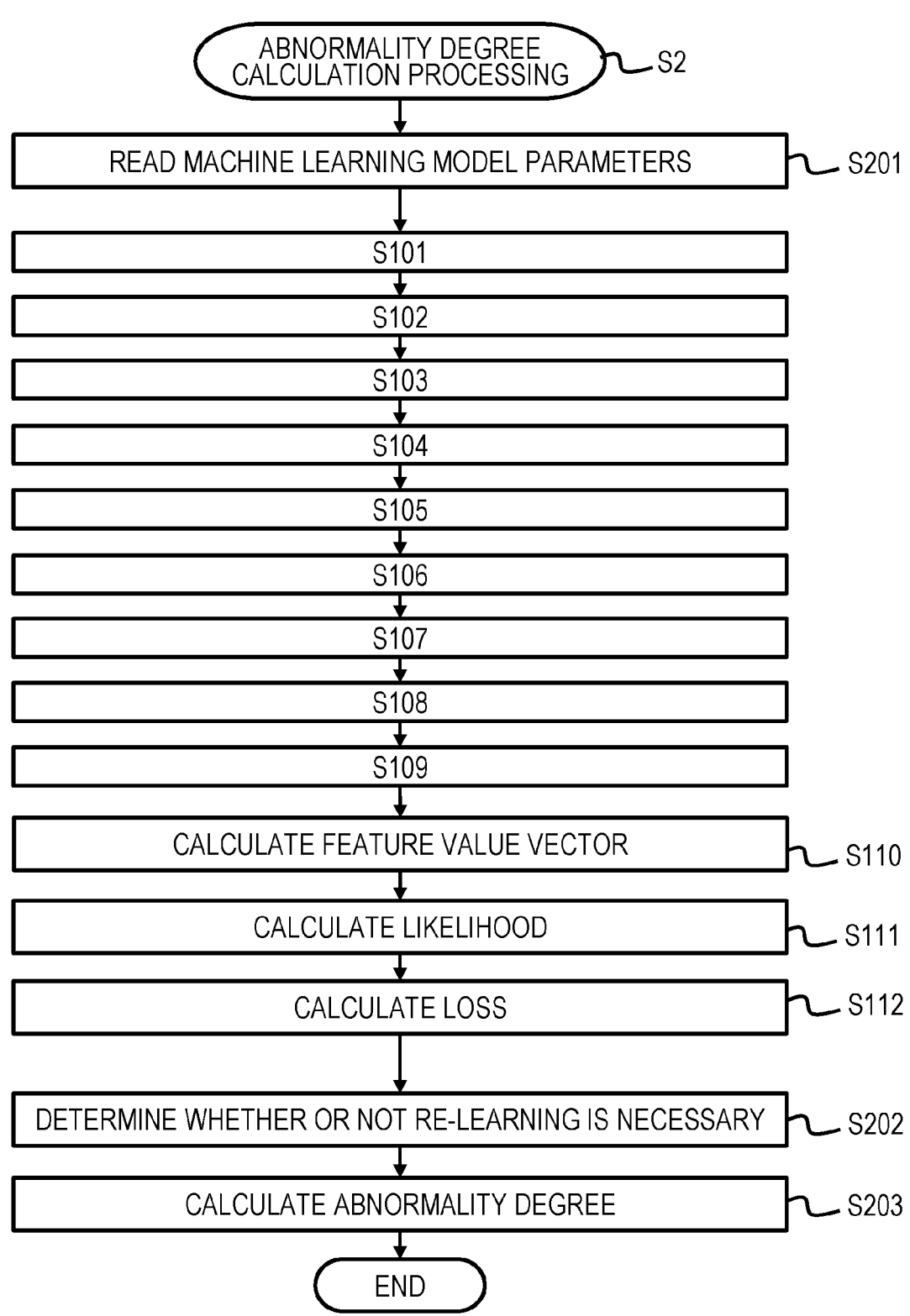
FIG. 18 is a processing flow of the abnormality degree calculation system at the time of calculation of the abnormality degree.

The processing at the time of calculation of the abnormality degree in the present embodiment will be described with reference to FIGS. 17 and 18. The type number D1 of the inputs D0 from the sensor terminals T is given to the concept classification D3 by the concept classification assignment unit 11. The sensor data D2 is converted into the feature value D4 by the feature value vector extraction unit 12.

When the set of the different devices having the same-level concept as the detection target device includes the plurality of types, the same-level concept classification assignment unit 31 investigates the relationship between each type of the different device having the same-level concept and the type of the detection target, and gives the weight w to each type of the different device having the same-level concept.

In addition to the sensor data D2 and the concept classification D3, the weight w corresponding to each type of the different devices having the same-level concept is stored in the training database DB1 for the case of re-learning.

The likelihood calculation unit 13 calculates the likelihood D5 from the feature value D4 calculated by the feature value vector extraction unit 12 by using the model obtained from the learning database DB2.

The re-learning necessity determination unit 16 performs the re-learning of the model by using the likelihood D5 and the concept classification D3 when the negative log-likelihood of the different device having the same-level concept as the detection target device exceeds a predetermined re-learning necessity determination threshold value Thc, and inputs the likelihood D5 of the data of the detection target device to the abnormality degree calculation unit 17 when the negative log-likelihood is less than the threshold value Thc (S202).

The abnormality degree calculation unit 17 calculates the abnormality degree of the sensor data of the detection target device based on the likelihood D5 of the data of the detection target device (S203).

The present embodiment, having the aforementioned configuration, achieves the same effects as those of the first embodiment. Furthermore, in the present embodiment, a type information database DB5 that retains type information and the same-level concept classification assignment unit 31 that assigns the weight according to the type of the different device having the same-level concept are added. Thus, according to the present embodiment, the influence of the data of the different devices having the same-level concept on the value of the loss D6 can be adjusted for each type of the different devices having the same-level concept. Accordingly, in the present embodiment, for example, it is possible to learn the model such that the likelihood of the similar data is decreased by the detection target device by giving a large weight to the device having the same drive system as the detection target device and giving a small weight to the type having a different drive system.

Note that the present invention is not limited to the above-mentioned embodiments, and includes various modification examples. For example, the aforementioned embodiments are described in detail in order to facilitate easy understanding of the present invention, and are not limited to necessarily include all the described components. Furthermore, some of the components of a certain embodiment can be substituted for the components of another embodiment, and the components of another embodiment can be added to the components of a certain embodiment. Furthermore, another component can be added, removed, or substituted to, from, or into some of the components of the aforementioned embodiments.

The components of the present invention can be arbitrarily selected, and an invention having a selected configuration is also included in the present invention. Furthermore, the configurations described in the claims can be combined into combinations other than those specified in the claims.

What is claimed is:

1. An abnormality degree calculation system that calculates an abnormality degree of a target device, the abnormality degree calculation system comprising:

a concept classification assignment unit configured to assign, based on a type number of the target device, a predetermined concept classification identifying the target device among a plurality of devices belonging to a common model and sharing a same-level concept;

a feature value vector extraction unit configured to generate, from sensor data obtained from a sensor corresponding to the target device and measuring sound or vibration produced during operation of the target device, a feature value vector representing physical characteristics of the sensor data;

a likelihood calculation unit configured to calculate, by inputting the feature value vector into a machine learning model trained to model a probability distribution of normal sensor data, a likelihood indicating conformity of the feature value vector to normal operation of the target device, wherein the machine learning model is trained such that feature value vectors derived from sensor data of the target device corresponding to the assigned concept classification are learned as normal data and output with a high likelihood, and feature value vectors derived from sensor data of other devices having the same-level concept as the target device are learned as abnormal data and output with a low likelihood, even when the other devices are operating normally, wherein, during training, model parameters are updated so as to enforce asymmetric likelihood behavior by increasing penalties when the likelihood for the target device decreases or when the likelihood for the other devices increases; and an abnormality degree calculation unit configured to calculate an abnormality degree representing a degree of abnormal operation of the target device, based on a likelihood that the likelihood calculation unit calculates.

2. The abnormality degree calculation system according to claim 1, wherein the predetermined concept classification is a concept classification obtained from the type number, and corresponds to the same-level concept belonging to a higher-level concept common to the target device and the other devices.

3. The abnormality degree calculation system according to claim 2, wherein different devices having the same-level concept as the target device are grouped as a minimum unit for classification by the machine learning model, and include a plurality of different types.

4. The abnormality degree calculation system according to claim 1, wherein the type number is information allocated according to a device type.

5. The abnormality degree calculation system according to claim 2, wherein the concept classification indicates whether sensor data corresponds to the target device or to one of the other devices having the same-level concept.

6. The abnormality degree calculation system according to claim 2, wherein a plurality of devices showing physical changes measurable during operation is grouped in advance as devices belonging to the common model and having different types, one device of the grouped plurality of devices is designated as the target device, and at least one other device of the grouped plurality of devices is designated as one of the other devices having the same-level concept.

7. The abnormality degree calculation system according to claim 1, further comprising:

a learning model likelihood calculation unit configured to calculate a likelihood of a learning model such that a model is learned not only at a time of learning but also during operation; and a learned model likelihood calculation unit configured to calculate a likelihood of a learned model stored at a start point of operation.

8. The abnormality degree calculation system according to claim 7, wherein the learning model likelihood calculation unit calculates the likelihood by reading a model from a learning database that stores a model sequentially updated at during operation, and the learned model likelihood calculation unit calculates the likelihood by reading a model from a learned database that stores a model corresponding to the start point of operation.

9. The abnormality degree calculation system according to claim 2, further comprising:

a same-level concept classification assignment unit configured to set a weight for each of the other devices according to a relationship between a lower-level concept of the target device and lower-level concepts of the other devices.

10. The abnormality degree calculation system according to claim 9, wherein the same-level concept classification assignment unit applies the weight to adjust an influence of likelihood values to each of the other devices on a loss value in a loss function used to train the machine learning model.

11. The abnormality degree calculation system according to claim 1, wherein the target device is a device that generates sound or vibration during operation.

12. An abnormality degree calculation method for calculating an abnormality degree of a target device by a computer, the abnormality degree calculation method comprising:

by the computer, assigning, based on a type number of the target device, a predetermined concept classification identifying the target device among a plurality of devices belonging to a common model and sharing a same-level concept;

generating, from sensor data obtained from a sensor corresponding to the target device and measuring sound or vibration produced by activation of the target device, a feature value vector representing physical characteristics of the sensor data;

calculating, by inputting the feature value vector into a machine learning model trained to model a probability distribution of normal sensor data, a likelihood indicating conformity of the feature value vector to normal operation of the target device, wherein the machine learning model is trained such that feature value vectors derived from the sensor data of the target device are learned as normal data and output with a high likelihood, and feature value vectors derived from sensor data of other devices having the same-level concept as the target device are learned as abnormal data and output with a low likelihood, even when the other devices are operating normally; and during training, updating model parameters so as to enforce asymmetric likelihood behavior by increasing penalties when the likelihood for the target device decreases or when the likelihood for the other devices increases; and calculating an abnormality degree representing a degree of abnormal operation of the target device based on the calculated likelihood.

13. The abnormality degree calculation system according to claim 1, further comprising:

a re-learning necessity determination unit configured to determine whether re-learning of the machine learning model is necessary based on the likelihood calculated by the likelihood calculation unit.

14. The abnormality degree calculation system according to claim 13, wherein the re-learning necessity determination unit determines whether the re-learning is necessary based on a likelihood of sensor data from one of the other devices having a same-level concept during operation.

15. The abnormality degree calculation system according to claim 2, further comprising:

a loss calculation unit configured to calculate a loss using a loss function defined as a function of likelihood values calculated by the likelihood calculation unit, wherein the loss function comprises:

(i) a first term that increases as the likelihood of feature value vectors derived from the sensor data of the target device decreases, and (ii) a second term that increases as the likelihood of feature value vectors derived from the sensor data of the other devices having the same-level concept increases, and wherein the loss calculation unit calculates a loss to be fed back to the machine learning model such that the sensor data of the target device is regarded as the normal data and is assigned the high likelihood, and sensor data from the other devices having the same-level concept as the target device are regarded as the abnormal data and are assigned the low likelihood.

16. The abnormality degree calculation system according to claim 15, further comprising a model update unit configured to update the machine learning model using the loss calculated by the loss calculation unit and a learned machine learning model.

* * * * *